US012626559B2

(12) United States Patent
Jhanb et al.

(10) Patent No.: US 12,626,559 B2
(45) Date of Patent: May 12, 2026

(54) GUI FOR GAME OF CHANCE WITH SKILL ELEMENT

(71) Applicant: Aristocrat Technologies, Inc., Las Vegas, NV (US)

(72) Inventors: Pratik Jhanb, Cumming, GA (US); Daniel Marks, Decatur, GA (US); Hua Xu, Marietta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 327 days.

(21) Appl. No.: 18/362,557

(22) Filed: Jul. 31, 2023

(65) Prior Publication Data

US 2025/0046145 A1 Feb. 6, 2025

(51) Int. Cl.
*G07F 17/32* (2006.01)
*G07F 17/34* (2006.01)

(52) U.S. Cl.
CPC .......... *G07F 17/3211* (2013.01); *G07F 17/34* (2013.01)

(58) Field of Classification Search
CPC ................. G07F 17/3211; G07F 17/34; G07F 17/3213; G07F 17/3267
See application file for complete search history.

(56) References Cited

U.S. PATENT DOCUMENTS

| | | | | |
|---|---|---|---|---|
| 8,216,061 | B2 | 7/2012 | Pacey | |
| 8,777,735 | B1 | 7/2014 | Fine | |
| 10,497,216 | B2 | 12/2019 | Colvin | |
| 11,468,740 | B2 | 10/2022 | Oberberger | |
| 2006/0252494 | A1 * | 11/2006 | Gerson | G07F 17/32 463/20 |
| 2023/0086207 | A1 | 3/2023 | Palmisano | |

* cited by examiner

*Primary Examiner* — Kevin Y Kim
(74) *Attorney, Agent, or Firm* — Weaver Austin Villeneuve & Sampson LLP

(57) ABSTRACT

A graphical user interface for providing skill-based tests that require players of a game of chance to engage in one or more deliberate actions in order to collect an award provided in response to an outcome in a game of chance.

20 Claims, 26 Drawing Sheets

FIG. 22
CREDITS
$00.00
WIN
$00.00
PAID
$00.00
BET
$00.00
MAXBET
AUTOPLAY
PLAY
MESSAGE LINE TEXT
MENU
RULES

GUI FOR GAME OF CHANCE WITH SKILL ELEMENT

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some games of chance, e.g., slot-type games, there may be certain symbols that, when displayed (or when at least a certain number of them are displayed) as part of a game outcome cause awards specific to each such symbol to be awarded to the player. Such symbols are typically referred to as "cash-on-reel" symbols.

SUMMARY

Disclosed herein are graphical user interfaces (GUIs) for use with games of chance having a skill element. In some jurisdictions, games of chance may be required to involve at least some element of skill, e.g., such a game may not provide a winning outcome that provides a payout based on a purely random determination without first requiring the user to perform some additional, non-random and deliberate action or task. For example, such games of chance may, in conjunction with presenting a random winning outcome, present a task GUI element that includes one or more sub-elements that must be interacted with in a predetermined manner by a user in order to cause a task-completion signal that is associated with that outcome. The gaming machine employing such a task GUI element may then, responsive to the generation of such a task completion signal, cause the corresponding award for that random winning outcome to be added to the credit meter of the GUI for the game of chance. However, if the task completion signal associated with a particular winning outcome is not received, e.g., within a predetermined period of time after the task GUI element is presented or, for example, prior to initiation of a subsequent play of the game of chance, then the user may forego the corresponding award for that winning outcome. In some cases, incorrect or inaccurate interaction with the task GUI element, e.g., dragging a coin to an incorrect sub-element of the task GUI element (for example, dragging a blue coin to a red piggy bank instead of a blue piggy bank), will be interpreted as an interaction that does not cause the task completion signal to be generated. In some such cases, such incorrect interactions with the task GUI element may also preclude the user from later causing the task completion signal to be generated by repeating the task GUI element interaction correctly for that winning outcome (for example, dragging a coin to an incorrect sub-element, e.g., piggy bank, may cause the coin to be placed into the wrong sub-element, thereby removing it from display and denying the user a subsequent chance to move the now-disappeared coin to the correct sub-element). In such a case, the award is not added to the credit meter of the GUI for the game of chance at all (although other awards corresponding to later winning outcomes that are obtained may be added to the credit meter of the GUI for the game of chance if the task completion signals associated with those winning outcomes are generated responsive to user interactions with the task GUI element).

By requiring the user to engage in completing a task-even if relatively trivial-gaming machines offering games of chance may satisfy regulatory requirements of some jurisdictions that they would otherwise be unable to be used within. However, gaming machines with such task GUI elements may present a less-than-satisfying user experience to the user since the user must interact with the task GUI element after any amount is won as a result of play of the game of chance. In many games of chance, a single "play" of the game of chance may actually involve a large number of bets that are made in parallel and resolved using a single game outcome. For example, in a slot machine game, there may be a plurality of paylines, e.g., different permutations of symbol positions drawn from each column of symbol positions. The sets of symbols that are shown in the symbol positions of the paylines may each be evaluated separately to see if those symbol sets form a winning symbol pattern. For a game of chance with multiple paylines that may all be played simultaneously, it is thus possible to have a single game outcome in which the symbols shown in the symbol positions for some, all, or none of the paylines form winning symbol patterns. As a result, it is often the case that a given game play is likely to have at least one winning symbol pattern displayed along a payline, resulting in at least some award being provided to the player. However, it is also often the case that the symbol patterns shown along other paylines for that game play will not be winning patterns. The bets for that game play made along the non-winning paylines will not result in awards being provided to the player, while the bet made along the winning payline will result in an award being provided to the player. The award that the player is provided in such a case may, in many cases, be relatively small, e.g., less than the total amount wagered in that particular game play. Accordingly, some users of such gaming machines may find it tiresome or bothersome to actually engage with the task GUI element for such small winning amounts and may thus forego interacting with the task GUI element in such cases (and thus forego the award that they could have earned). As a result, such users will experience lower returns over time and may have a negative view of the game of chance/user experience. Conversely, users that do take the time and make the effort to interact with the task GUI element for all awards that are provided may maximize their return from such a game of chance but may resent being made to engage in dealing with the task GUI element repeatedly for relatively small award amounts.

The GUIs for games of chance discussed herein provide enhanced user experiences that make it more likely that users of gaming machines presenting such GUIs will engage with the task GUI elements of such GUIs and/or reduce the resentment players may develop in response to having to interact with the task GUI elements in order to be provided with the awards that may have resulted from an outcome for a play of a game of chance.

For example, in the task GUI elements discussed herein, completion of the "task" may not only cause the award that triggered the need for the user to perform the task to be provided to that user, but may also potentially cause an additional award to be provided to the user. For example, a game of chance with such a task GUI element may be configured to, for each "successful" interaction of a user with the task GUI element (with a "successful" interaction being one in which the user performed the predetermined task that would result in the task completion signal being generated), also make a random determination of whether an additional award of some type is to be provided to the user (beyond the award that caused the user to have to interact with the task GUI element in the first place). If it is determined that such an additional award is to be provided to a user as a result of a successful task GUI element interaction, then that award may be provided to the user without requiring a further interaction with a task GUI element. In some implementations, the probability that such an additional award may be provided to a user may be adjusted based on the amount of the award that caused the user to have to interact with the task GUI element in the first place (this award, for example, may be referred to herein as a "base award"). For example, in some instances, an electronic gaming machine implementing such task GUI elements may be configured to weight the random determination of whether or not to provide an additional award such that there is a higher chance of such an additional award being provided for a base award that is below a certain threshold as compared with the chance or chances that such an additional award will be provided for a base award that is above or at the threshold. In some similar such implementations, there may be a plurality of different probabilities that an additional award may be provided to the user on successful interaction with the task GUI element, with each probability associated with a different value or range of values for the base award. For example, there may be a 1.0% chance of an additional award being provided responsive to successful interaction of the user with the task GUI element in response to a base award with a value of 10 credits or less, a 0.9% chance of an additional award being provided responsive to successful interaction of the user with the task GUI element in response to a base award greater than 10 credits but no larger than 20 credits, a 0.8% chance of an additional award being provided responsive to successful interaction of the user with the task GUI element in response to a base award greater than 10 credits but no larger than 20 credits, a 0.7% chance of an additional award being provided responsive to successful interaction of the user with the task GUI element in response to a base award greater than 20 credits but no larger than 40 credits, and a 0.5% chance of an additional award being provided responsive to successful interaction of the user with the task GUI element in response to a base award greater than 40 credits. While such implementations may feature probabilities of an additional award being provided that generally increase or decrease with increasing base award amounts or increasing tiers of base award amounts, implementations in which such probabilities generally decrease with increasing base award amounts or increasing tiers of base award amounts may be particularly advantageous since they may result in the user being provided with an additional award more often in response to successful task GUI element interactions for lower base award amounts than for successful task GUI element interactions for higher base award amounts. As the user is more likely to forego performing the task GUI element interaction for lower-amount base awards than higher-amount base awards, such systems may increase the chances that users will interact with the task GUI element and thereby collect the respective base award in the hopes of obtaining an additional award.

In some cases, the additional award may be in the form of a bonus game in which the player may be required to interact with a bonus game GUI in order to obtain the additional award, but interaction with the task GUI element that triggered the bonus game may—in addition to serving as the "element of skill" that allows the triggering award to be provided to the user—also serve as the "element of skill" that allows whatever award is earned in the bonus game to be provided to the player without requiring a further interaction with a task GUI element.

In some implementations, the determination of whether or not a given successful task GUI element interaction should result in an additional award being provided may not be a random determination, but may instead be semi-random or according to a non-random schedule, e.g., after some number of task completion signals has been generated since a particular point in time. For example, a determination may be made that an additional award is to be provided if a threshold number of task completion signals is generated after a particular time, e.g., the last time that the additional award was provided. For example, some games of chance that incorporate task GUI elements may be configured to provide an additional award after every X successful task GUI element interactions, where X is a positive integer, e.g., 100 successful task GUI element interactions. In some such cases, such a game of chance may require that the user perform at least X successful task GUI element interactions before the game of chance starts to make random determinations after each successful task GUI element interaction as to whether an additional award will be provided. In yet other examples, the game of chance may be configured to modify the chance of an additional award being provided based on the number of successful task GUI element interactions that have occurred since the last time an additional award was provided in response to a successful task GUI element interaction.

Such additional awards give users an extra incentive to engage with the task GUI element. The potential for such an additional award introduces a new element of excitement that users may experience when interacting with the task GUI element-one that turns such interactions with a task GUI element from an experience that must be endured in order to obtain what the user feels should already be rightfully theirs (the award that triggered requiring the user to interact with the task GUI element in the first place) to an experience that gives the player an opportunity to be provided an additional award that they might not otherwise be entitled to (or that they have been working to over an extended period of time).

In some implementations, an electronic gaming machine may be provided that includes one or more displays, one or more processors, and one or more memory devices. The one or more memory devices may store computer-executable instructions which, when executed by the one or more processors, cause the one or more processors to cause a graphical user interface (GUI) for a game of chance to be presented on the one or more displays, receive one or more indications of a play of the game of chance, generate, responsive to receiving each indication of a play of the game of chance, a corresponding outcome for the game of chance and cause the corresponding outcome to be presented on the one or more displays, determine, for each corresponding outcome, whether the corresponding outcome is a winning outcome associated with a corresponding award, cause, responsive each determination that a corresponding outcome is a winning outcome, a task GUI element to be activated that requires that one or more sub-elements of the task GUI element be interacted with in a predetermined manner by a user in order to cause a task completion signal associated with that corresponding outcome to be generated, cause, responsive to each generation of the task completion signal, the corresponding award for the corresponding outcome to be added to a credit meter of the GUI for the game of chance, determine, in association with each generation of the task completion signal, whether a task completion bonus condition is met, and cause, responsive to each determination that the task completion bonus condition is met, a task completion bonus to be provided to the user, wherein the task completion bonus is in addition to the corresponding award.

In some further implementations, the one or more memory devices may store further computer-executable instructions which, when executed by the one or more processors, additionally cause the one or more processors to, for each determination of whether the task completion bonus condition is met, randomly determine whether the task completion bonus condition is met.

In some such implementations, the one or more memory devices may store further computer-executable instructions which, when executed by the one or more processors, may additionally cause the one or more processors to randomly determine that the task completion bonus is met according to a selected probability, select a first probability as the selected probability responsive to the corresponding award having an amount within a first range, and select a second probability as the selected probability responsive to the corresponding award having an amount within a second range. In some such implementations, the first probability may greater than the second probability and the first range may be lower than the second range.

In some further implementations, the one or more memory devices may store further computer-executable instructions which, when executed by the one or more processors, additionally cause the one or more processors to count, from a first time, a number of task completion signals generated since the first time and to determine that the task completion bonus condition is met when the number of task completion signals generated since the first time meets a first threshold number.

In some implementations, the one or more memory devices may store further computer-executable instructions which, when executed by the one or more processors, additionally cause the one or more processors to provide the task completion bonus to the user by adding a predetermined amount to the credit meter of the GUI for the game of chance.

In some implementations, the one or more memory devices may store further computer-executable instructions which, when executed by the one or more processors, additionally cause the one or more processors to provide the task completion bonus to the user by causing a bonus game GUI to be presented for one or more bonus game plays, determining, based on outcomes for the bonus game, a bonus game award amount, and adding the bonus game award amount to the credit meter of the GUI for the game of chance.

In some implementations, a first sub-element of the task GUI element may be associated with an ordered sequence of graphical states, and the one or more memory devices may store further computer-executable instructions which, when executed by the one or more processors, additionally cause the one or more processors to cause, responsive to the generation of multiple task completion signals, the first sub-element of the task GUI element to, responsive to each generation of one of the task completion signals in a subset of the multiple task completion signals, transition to a next graphical state in the ordered sequence of graphical states, and cause an award animation involving, at least in part, the first sub-element of the task GUI to be presented responsive to the task completion bonus condition being met.

In some such implementations, the ordered sequence of graphical states may depict the first sub-element of the task GUI element in increasingly enlarged states.

In some implementations, one or more non-transitory, computer-readable media may be provided that store computer-executable instructions which, when executed by one or more processors, cause the one or more processors to cause a graphical user interface (GUI) for a game of chance to be presented on one or more displays of a gaming machine, receive one or more indications of a play of the game of chance, generate, responsive to receiving each indication of a play of the game of chance, a corresponding outcome for the game of chance and cause the corresponding outcome to be presented on the one or more displays, determine, for each corresponding outcome, whether the corresponding outcome is a winning outcome associated with a corresponding award, cause, responsive each determination that a corresponding outcome is a winning outcome, a task GUI element to be activated that requires that one or more sub-elements of the task GUI element be interacted with in a predetermined manner by a user in order to cause a task completion signal associated with that corresponding outcome to be generated, cause, responsive to each generation of the task completion signal, the corresponding award for the corresponding outcome to be added to a credit meter of the GUI for the game of chance, determine, in association with each generation of the task completion signal, whether a task completion bonus condition is met, and cause, responsive to each determination that the task completion bonus condition is met, a task completion bonus to be provided to the user, wherein the task completion bonus is in addition to the corresponding award.

In some such implementations, the one or more non-transitory, computer-readable media may further store additional computer-executable instructions which, when executed by the one or more processors, additionally cause the one or more processors to, for each determination of whether the task completion bonus condition is met, randomly determine whether the task completion bonus condition is met.

In some implementations, the one or more non-transitory, computer-readable media may further store additional computer-executable instructions which, when executed by the one or more processors, additionally cause the one or more processors to count, from a first time, a number of task completion signals generated since the first time and to determine that the task completion bonus condition is met when the number of task completion signals generated since the first time meets a first threshold number.

In some implementations, the one or more non-transitory, computer-readable media may further store additional computer-executable instructions which, when executed by the one or more processors, additionally cause the one or more processors to provide the task completion bonus to the user by adding a predetermined amount to the credit meter of the GUI for the game of chance.

In some implementations, the one or more non-transitory, computer-readable media may further store additional computer-executable instructions which, when executed by the one or more processors, additionally cause the one or more processors to provide the task completion bonus to the user by causing a bonus game GUI to be presented for one or more bonus game plays, determining, based on outcomes for the bonus game, a bonus game award amount, and adding the bonus game award amount to the credit meter of the GUI for the game of chance.

In some implementations, a first sub-element of the task GUI element may be associated with an ordered sequence of graphical states, and the one or more non-transitory, computer-readable media may further store additional computer-executable instructions which, when executed by the one or more processors, additionally cause the one or more processors to cause, responsive to the generation of multiple task completion signals, the first sub-element of the task GUI element to, responsive to each generation of one of the task completion signals in a subset of the multiple task completion signals, to transition to a next graphical state in the ordered sequence of graphical states, and cause an award animation involving, at least in part, the first sub-element of the task GUI to be presented responsive to the task completion bonus condition being met.

In some implementations, the ordered sequence of graphical states may depict the first sub-element of the task GUI element in increasingly enlarged states.

In some implementations, a method may be provided that includes causing, by one or more processors of an electronic gaming machine having one or more displays, a graphical user interface (GUI) for a game of chance to be presented on the one or more displays, receiving, by the one or more processors, one or more indications of a play of the game of chance, generating, by the one or more processors and responsive to receiving each indication of a play of the game of chance, a corresponding outcome for the game of chance and causing the corresponding outcome to be presented on the one or more displays, determining, by the one or more processors and for each corresponding outcome, whether the corresponding outcome is a winning outcome associated with a corresponding award, determining, by the one or more processors and at least one of the corresponding outcomes, that the corresponding outcome is a winning outcome associated with a corresponding award, causing, by the one or more processors and responsive each determination that a corresponding outcome is a winning outcome, a task GUI element to be activated that requires that one or more sub-elements of the task GUI element be interacted with in a predetermined manner by a user in order to cause a task completion signal associated with that corresponding outcome to be generated, generating, by the one or more processors, at least one task completion signal responsive to the one or more sub-elements of the task GUI element being interacted with in the predetermined manner, causing, by the one or more processors and responsive to each generation of the task completion signal, the corresponding award for the corresponding outcome to be added to a credit meter of the GUI for the game of chance, determining, by the one or more processors and in association with the generation of at least one task completion signal, that a task completion bonus condition is met, and causing, by the one or more processors and responsive to determining that the task completion bonus condition is met, a task completion bonus to be provided to the user, wherein the task completion bonus is in addition to the corresponding award.

In some implementations of the method, the method may further include randomly determining, by the one or more processors, that the task completion bonus condition is met.

In some implementations of the method, the method may further include determining, by the one or more processors, that the task completion bonus condition is met by a number of task completion signals generated since a first time meeting a first threshold number.

In some implementations of the method, the method may further include providing, by the one or more processors, the task completion bonus to the user by causing a predetermined amount to be added to the credit meter of the GUI for the game of chance.

In some implementations of the method, the method may further include providing the task completion bonus to the user by causing a bonus game GUI to be presented for one or more bonus game plays, determining, based on outcomes for the bonus game, a bonus game award amount, and adding the bonus game award amount to the credit meter of the GUI for the game of chance.

In some implementations of the method, a first sub-element of the task GUI element may be associated with an ordered sequence of graphical states, and the method may further include generating, by the one or more processors, multiple task completion signals responsive to multiple instances of the one or more sub-elements of the task GUI element being interacted with in the predetermined manner, causing, by the one or more processors and responsive to the generation of the multiple task completion signals, the first sub-element of the task GUI element to, responsive to each generation of one of the task completion signals in a subset of the multiple task completion signals, transition to a next graphical state in the ordered sequence of graphical states, and causing, by the one or more processors, an award animation involving, at least in part, the first sub-element of the task GUI to be presented responsive to the task completion bonus condition being met.

The Figures are provided for the purpose of providing examples and clarity regarding various aspects of this disclosure and are not intended to be limiting.

DETAILED DESCRIPTION

The following discussion provides overall context for gaming machines that may be used to implement a feature game mechanic such as is described above and later herein. Following this overview, a more focused discussion of the task GUI element concepts discussed above is provided.

Figure 1:
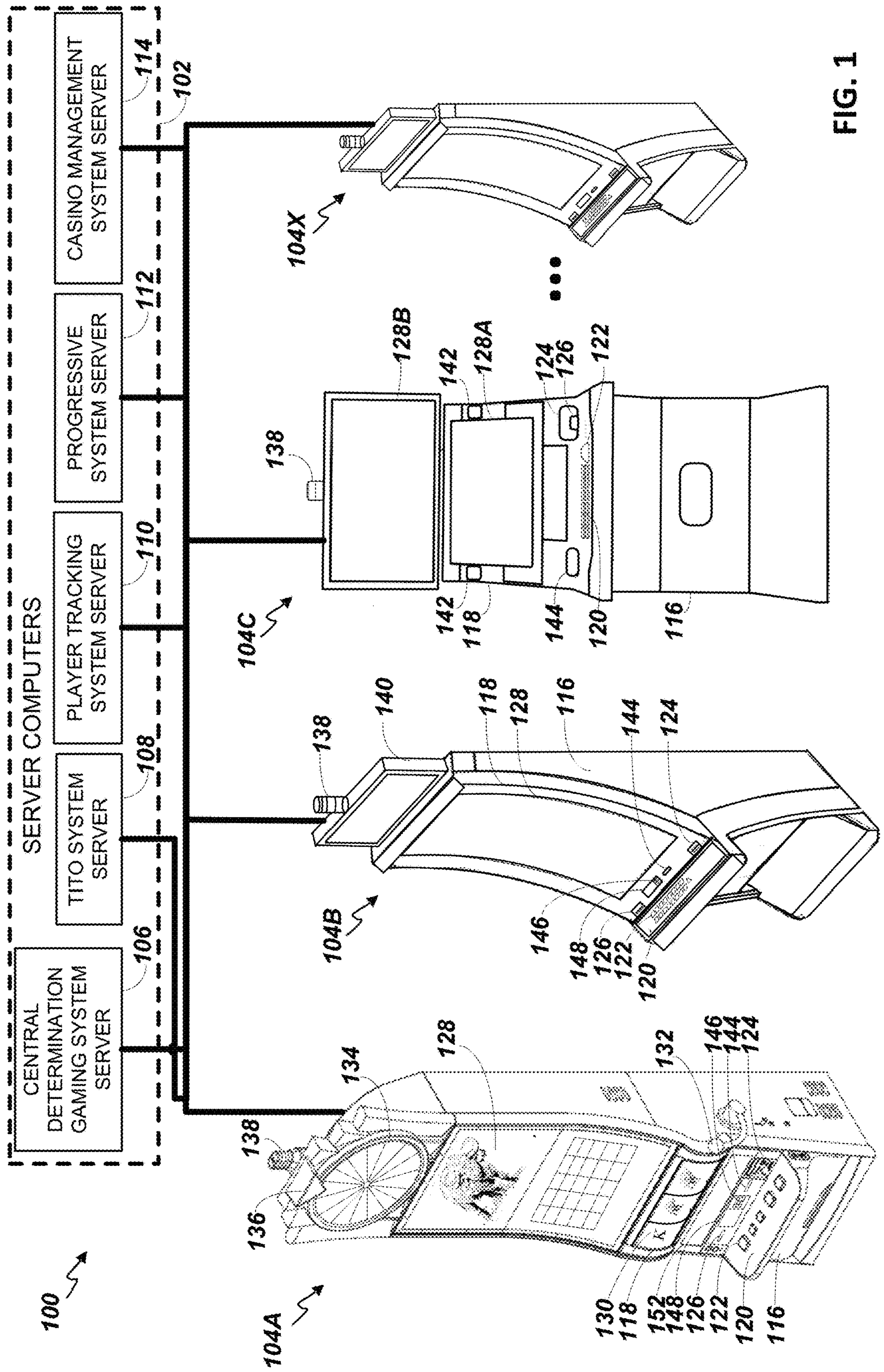
FIG. 1 is an exemplary diagram showing several EGMs networked with various gaming-related servers.

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
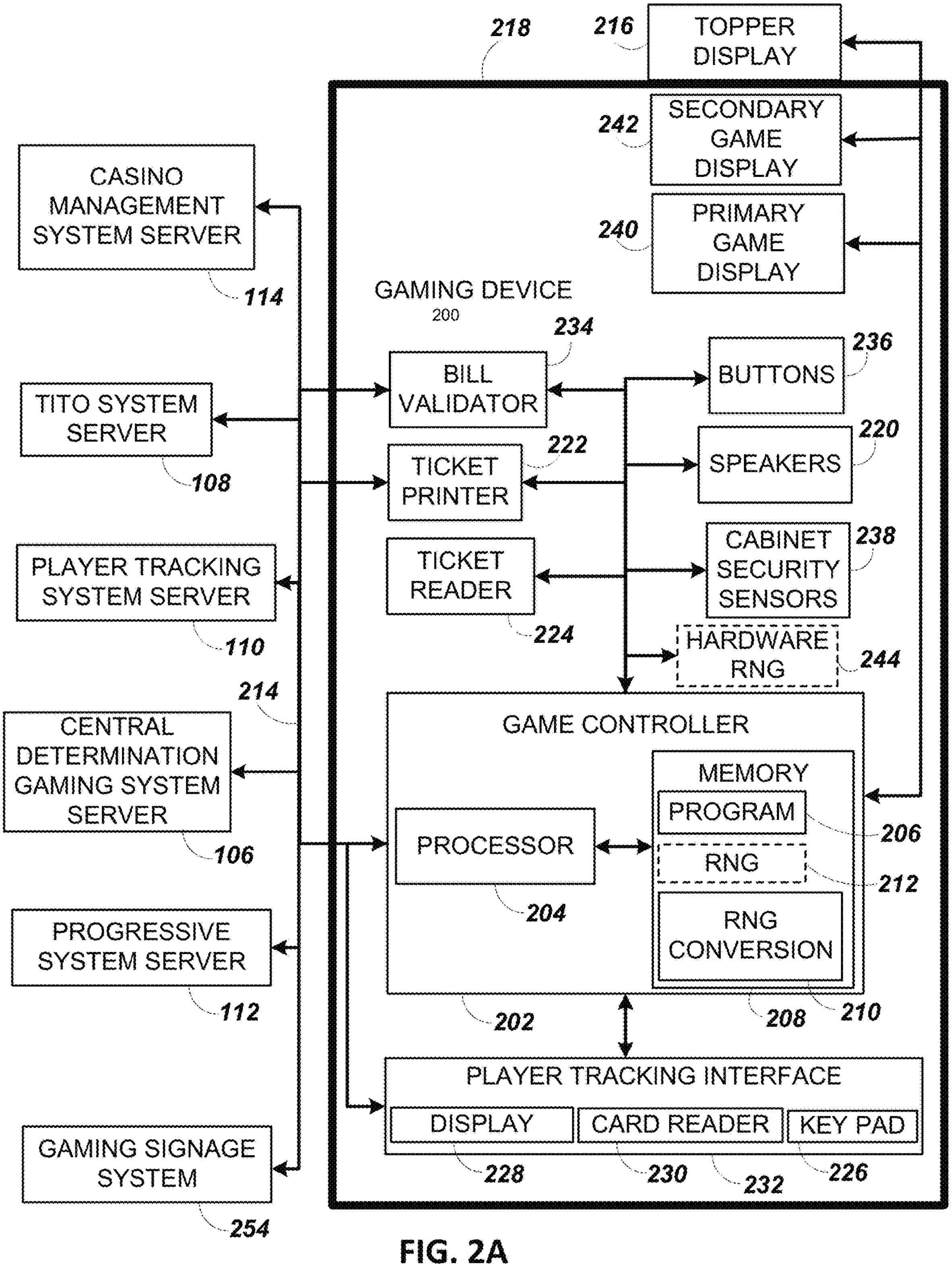
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
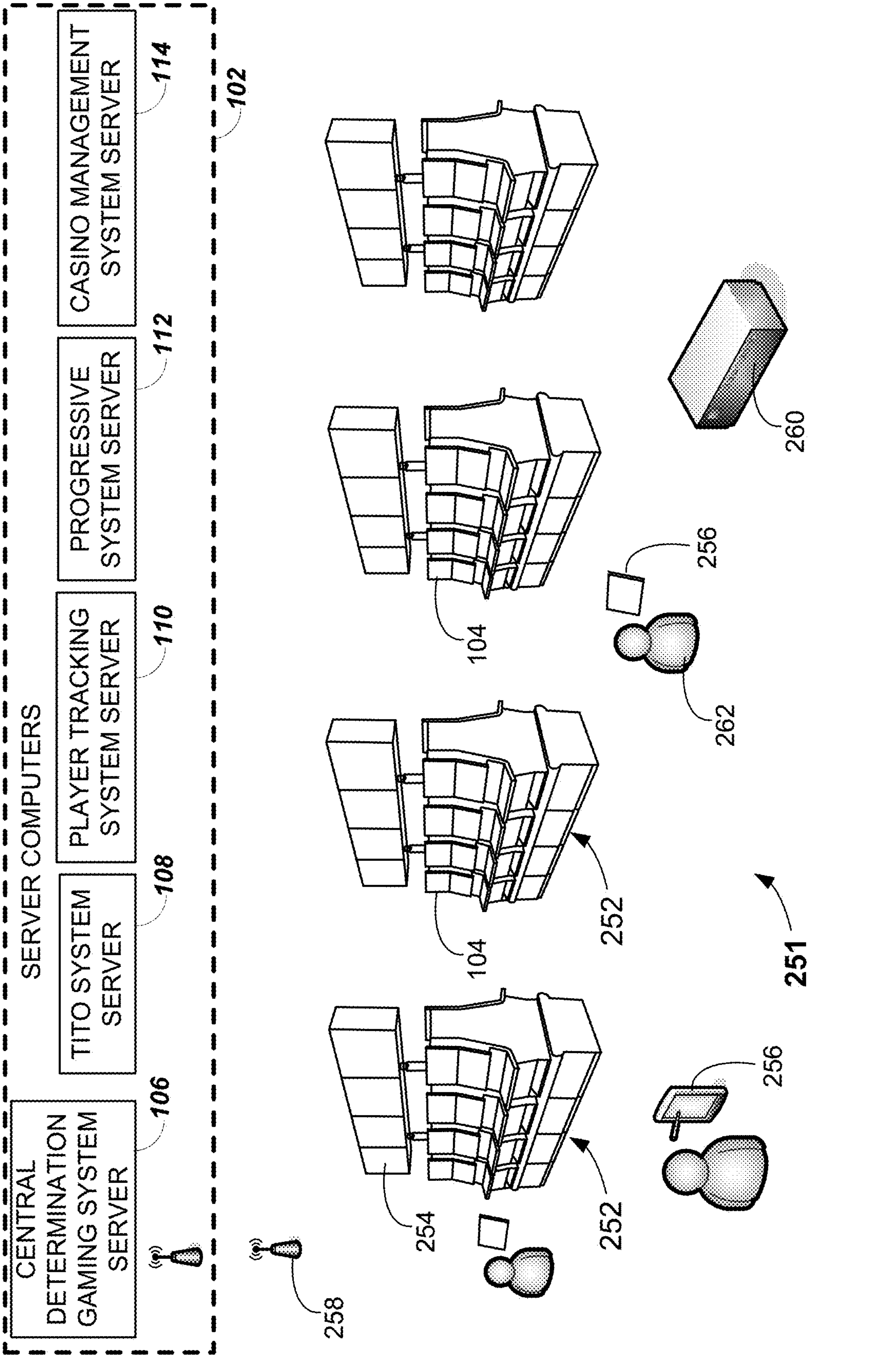
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
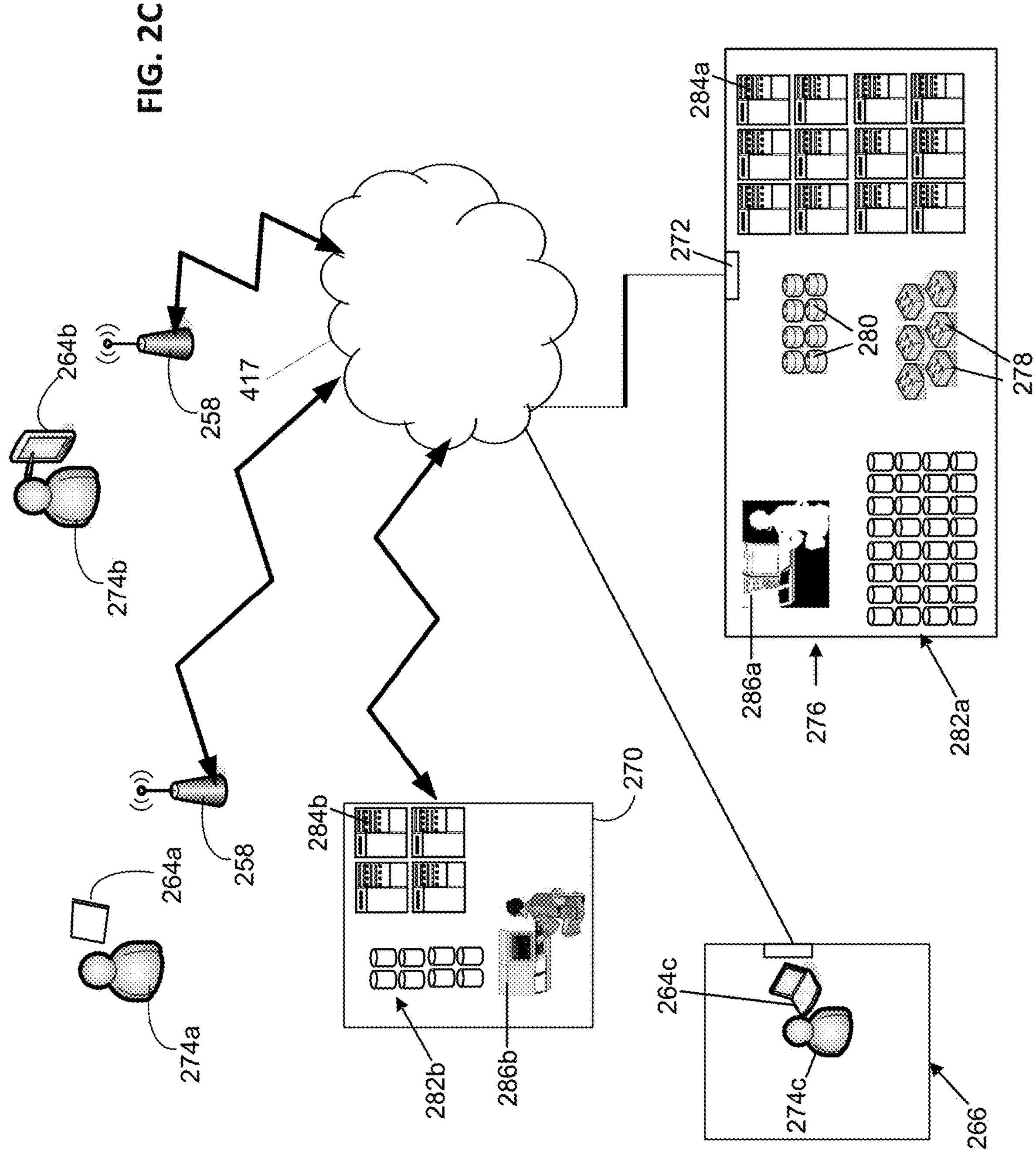
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
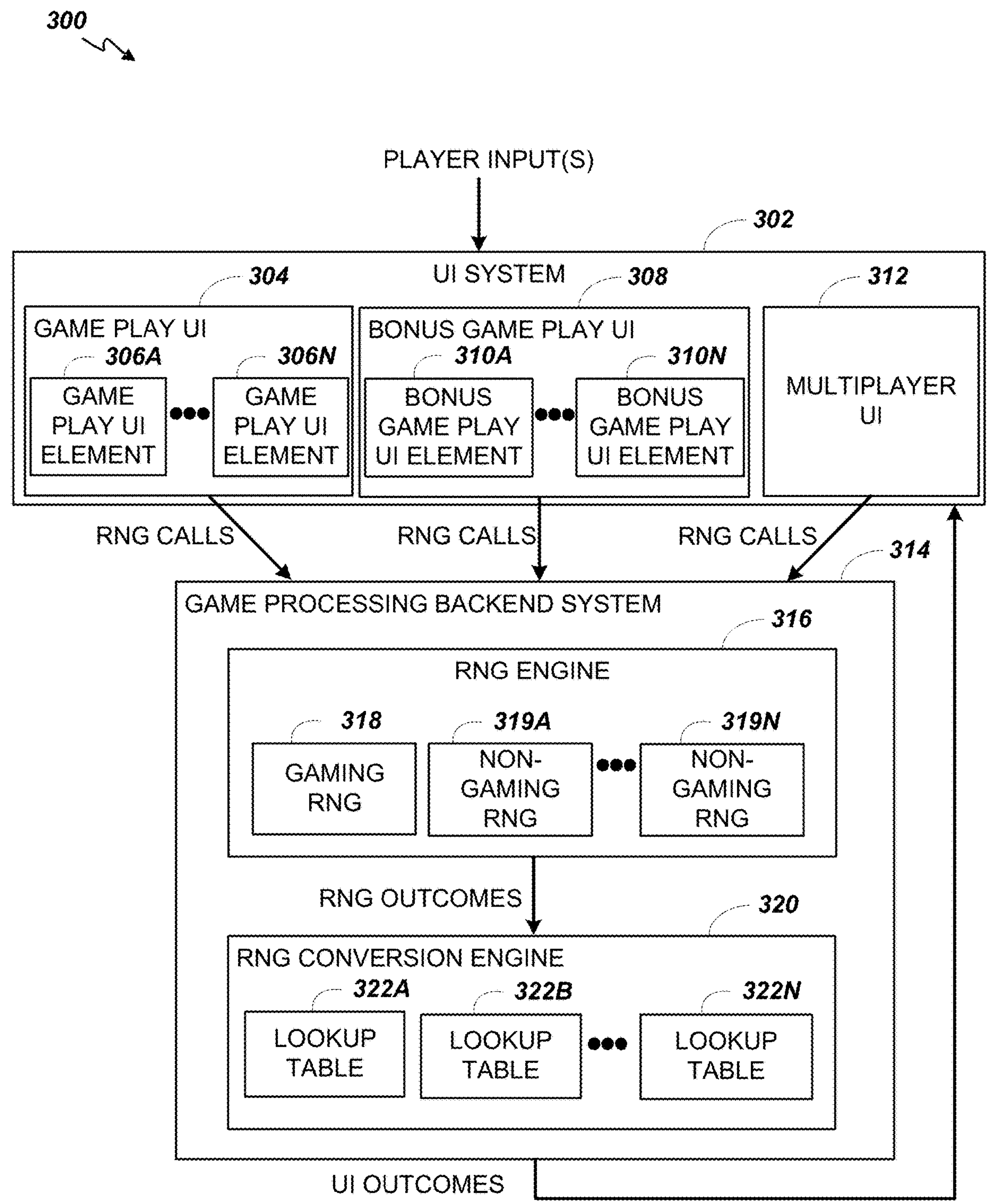
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As discussed earlier, in some jurisdictions, gaming machines that provide games of chance must require users thereof to engage in an act of skill, e.g., by completing a task of some sort, in order for an award resulting from a winning outcome to be credited to the user. The task does not need to be very onerous, and can be as simple as, for example, dragging and dropping an icon or image displayed on a GUI from one location in the GUI to another location in the GUI. In other examples, the task may, for example, require that the user choose a specific option of multiple options, e.g., the user is provided with three depictions of a coin, each showing the coin in a different color, and the user is then asked to select the coin having a particular color (or to drag the coin that is the same color as another graphical element in the GUI, e.g., a chest, to that other graphical element).

FIGS. 4 through 8 depict a GUI for a game of chance that may be used to implement the concepts discussed herein in various states of display. For example, in FIG. 4, a GUI for game of chance 400 is depicted that includes an array of symbol positions 402, in this case, an array that has five columns of symbol positions 402 and three rows of symbol positions 402. Other implementations may feature arrays of symbol positions 402 that have other dimensions, e.g., 3×3, 3×4, 4×3, 3×5, 4×5, 5×4, etc. The GUI for the game of chance 400 may include a credit or score meter 412, a bet indicator 414, and a play button 416. The credit or score meter 412 may reflect the user's score while playing the game of chance. The bet indicator 414, which may be optional, may indicate the amount of credits or points that the user intends to bet when engaging in a play of the game of chance. The play button 416 may, for example, be a user-activatable control that may be interacted with by the user in order to allow the user to indicate that they wish to initiate a play of the game of chance.

In this example, the game of chance is a slot game. Thus, when the play button 416 is pressed by a user, the gaming machine presenting the game of chance is caused to present a game outcome in which symbols 404 are selected and displayed in the symbol positions 402. Such selection of the symbols 404 is typically done according to output from a random number generator, i.e., a random selection, and may be performed in a variety of ways.

For example, in some implementations, each symbol 404 displayed in each symbol position 402 may be selected randomly and independently from the selection of other symbols 404 displayed in the other symbol positions 402. In other implementations, the symbols 404 displayed in each of the symbol positions 402 of each column may be randomly selected as a block from a larger, ordered sequence of symbols 404. For example, each column of symbol positions 402 may be associated with a particular ordered sequence of symbols 404, e.g., a reel strip, and a random selection may be made of X adjacent symbols 404 in that ordered sequence of symbols 404, where X is the number of symbol positions 402 in the associated column of symbol positions 402 (the ordered sequences of symbols 404 may be circular or modulo sequences such that when a selected block of symbols 404 extends past the start or end of the sequence, the symbols 404 at the other of the end and the start of the sequence are used to provide missing symbols 404).

As in a typical slot machine, the game of chance that is provided via the GUI for the game of chance 400 may include a plurality of paylines 406. Only one payline 406 is shown in FIG. 4, but it will be understood that there may be multiple such paylines 406, and that such paylines 406 may each include, for example, one symbol position 402 from each column of symbol positions 402 (with the order of symbol positions 402 in each payline 406 reflecting the order of the columns of symbol positions 402 from which the symbol positions 402 in the payline 406 are drawn).

When a game outcome, e.g., the symbols 404 shown in the symbol positions 402, results in a winning pattern of symbols 404 being displayed in the symbol positions 402 that make up a given payline, a corresponding award may be provided to the user—although in the GUIs discussed herein, only after the user also successfully interacts with a task GUI element (discussed later with respect to subsequent figures). The gaming machine may determine if a winning pattern exists along a payline by, for example, comparing the symbols 404 shown along such a payline against example winning patterns that may be stored in memory (along with corresponding win amounts associated with those winning patterns).

Figure 4:
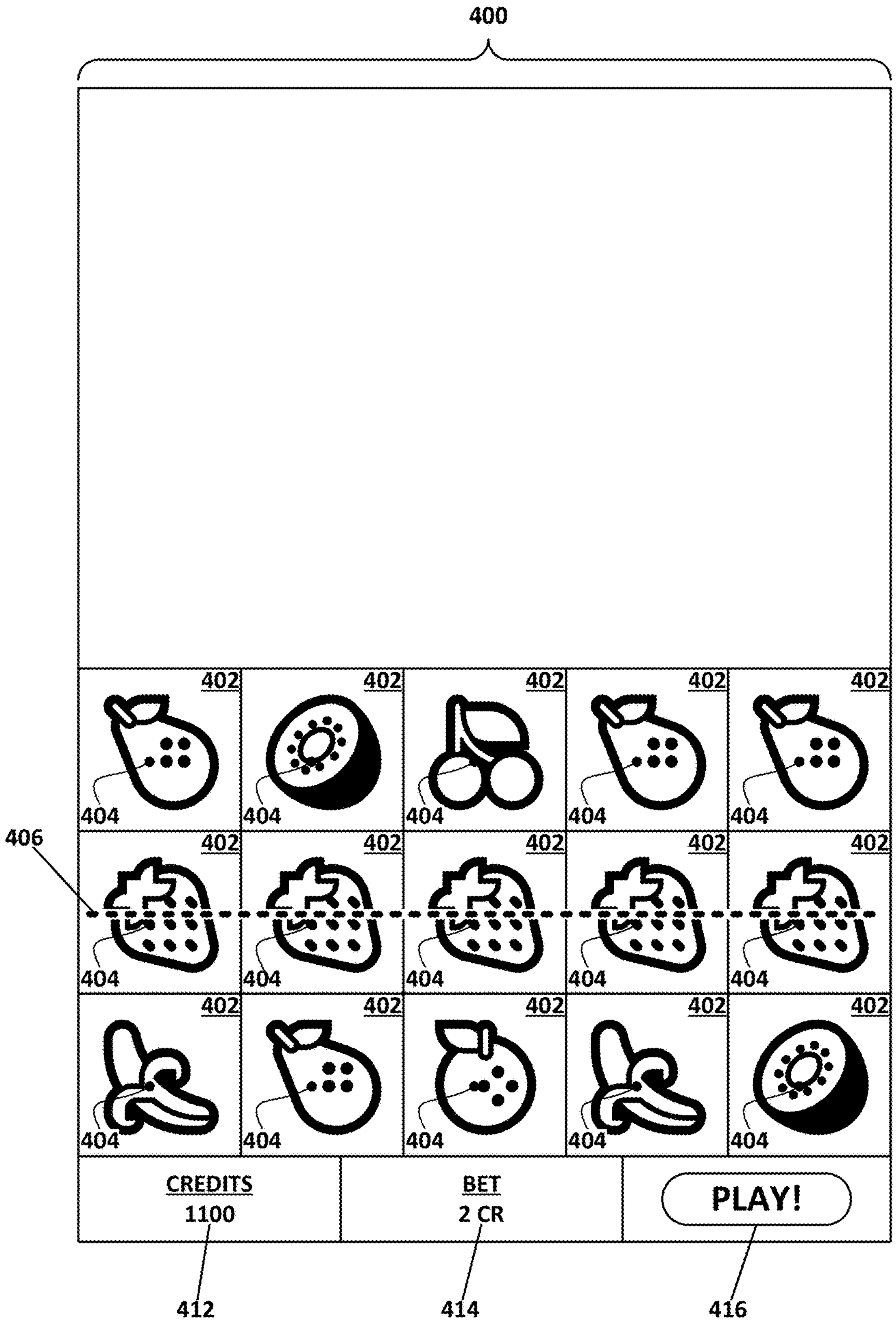
FIGS. 4 through 8 depict a GUI for a game of chance that may be used to implement the concepts discussed herein in various states of display.

In the example of FIG. 4, an outcome has been provided that includes five strawberry symbols 404 along the middle row of symbol positions 402. In this game, achieving five-of-a-kind of any symbol along a payline, such as the payline 406, results in a winning outcome that would cause an award to be provided to the user. In this example, the award in question is a 50-credit award, but other implementations and/or winning patterns may result in other awards being provided. As the GUI for the game of chance 400 is on a gaming machine that is configured for use in a jurisdiction that requires that the gaming machine user engage in an act of skill prior to actually being provided with such an award, the GUI for the game of chance 400 may be caused to progress to the state shown in FIG. 5, in which a task GUI element 408 has been caused to be activated. In this example, the task GUI element 408 has been caused to be displayed and was not visible while inactive. It will be understood, of course, that the task GUI element 408 may also be caused to be displayed even when there is no award being provided, e.g., when the task GUI element 408 may be inactive—in such cases, the task GUI element 408 may be displayed (potentially in a greyed-out or other manner that indicates it is "inactive" or not requiring interaction by the user), but no interaction with it would be required until a winning outcome is obtained by the user as a result of a game play of the game of chance.

The task GUI element 408 may generally be configured to require that one or more sub-elements of the task GUI element 408 be interacted with in a predetermined manner by a user in order to cause a task completion signal that is associated with the outcome that caused the task GUI element 408 to be activated to be generated.

The task GUI element 408, as can be seen, may have one or more sub-elements 410. In this example, the task GUI element 408 includes a sub-element 410*a* that is a coin, a sub-element 410*b* that is an arrow, and a sub-element 410*c* that is a money bag. The text that is shown, e.g., "TO COLLECT 50 CR AWARD, SLIDE THE COIN TO THE COIN BAG!" and "IN ADDITION TO COLLECTING THE 50 CR AWARD, SLIDING THE COIN TO THE COIN BAG MAY SOMETIMES AWARD ADDITIONAL CREDITS!," may also be considered to be sub-elements 410 of the task GUI element 408, but are not indicated with callouts in this example (the callouts being used to indicate the graphical sub-elements 410 of the task GUI element 408 of FIG. 5, as opposed to textual sub-elements thereof).

In the example task GUI element 408, the task GUI element 408 is configured such that the sub-element 410*a* is a graphical object, e.g., a representation of a coin, that is able to be selected and moved by the user, e.g., via input provided to a touch-screen display used to present the task GUI element 408. The sub-element 410*b* (the arrow) provides a graphical indication to the user of what task they must perform (the text "TO COLLECT 50 CR AWARD, SLIDE THE COIN TO THE COIN BAG!" provides additional instructions to the user as to what must be done). The sub-element 410*c* depicts a graphic that is used to represent a target for the user action, e.g., a region of the task GUI element 408 that the user must move the sub-element 410*a* to. The task GUI element 408 may also indicate to the user, in some manner, that completing the interaction with the task GUI element 408 may result in an additional award beyond the award that resulted from the just-completed play of the game of chance, e.g., 50 credits in the present example. This may be done explicitly, e.g., via the text "IN ADDITION TO COLLECTING THE 50 CR AWARD, SLIDING THE COIN TO THE COIN BAG MAY SOMETIMES AWARD ADDITIONAL CREDITS!" as part of the task GUI element 408 or may be communicated to the player less explicitly, e.g., via instructions that may be presented at the start of a game session but which are not explicitly shown to the user via the GUI during normal game play.

It will be understood that task GUI elements 408 for other implementations may take any of a variety of forms. For example, in some implementations, the task GUI element 408 may include a plurality of sub-elements that are similar, but may have different graphical characteristics, e.g., a different size and/or color. Such a task GUI element may instruct the user to select the sub-element having a particular graphical characteristic, e.g., "select the largest key" or "select the red coin," in order to perform the interaction with the task GUI element 408 that is required in order to cause the award that caused the task GUI element 408 to be interacted with to be provided to the user. In other such implementations, the task GUI element 408 may additionally require that the user not only select a particular sub-element 410 of several sub-elements 410, but also manipulate that selected sub-element 410 in a particular manner, e.g., by dragging the selected sub-element 410 to a particular location, e.g., to another designated sub-element 410.

Figure 5:
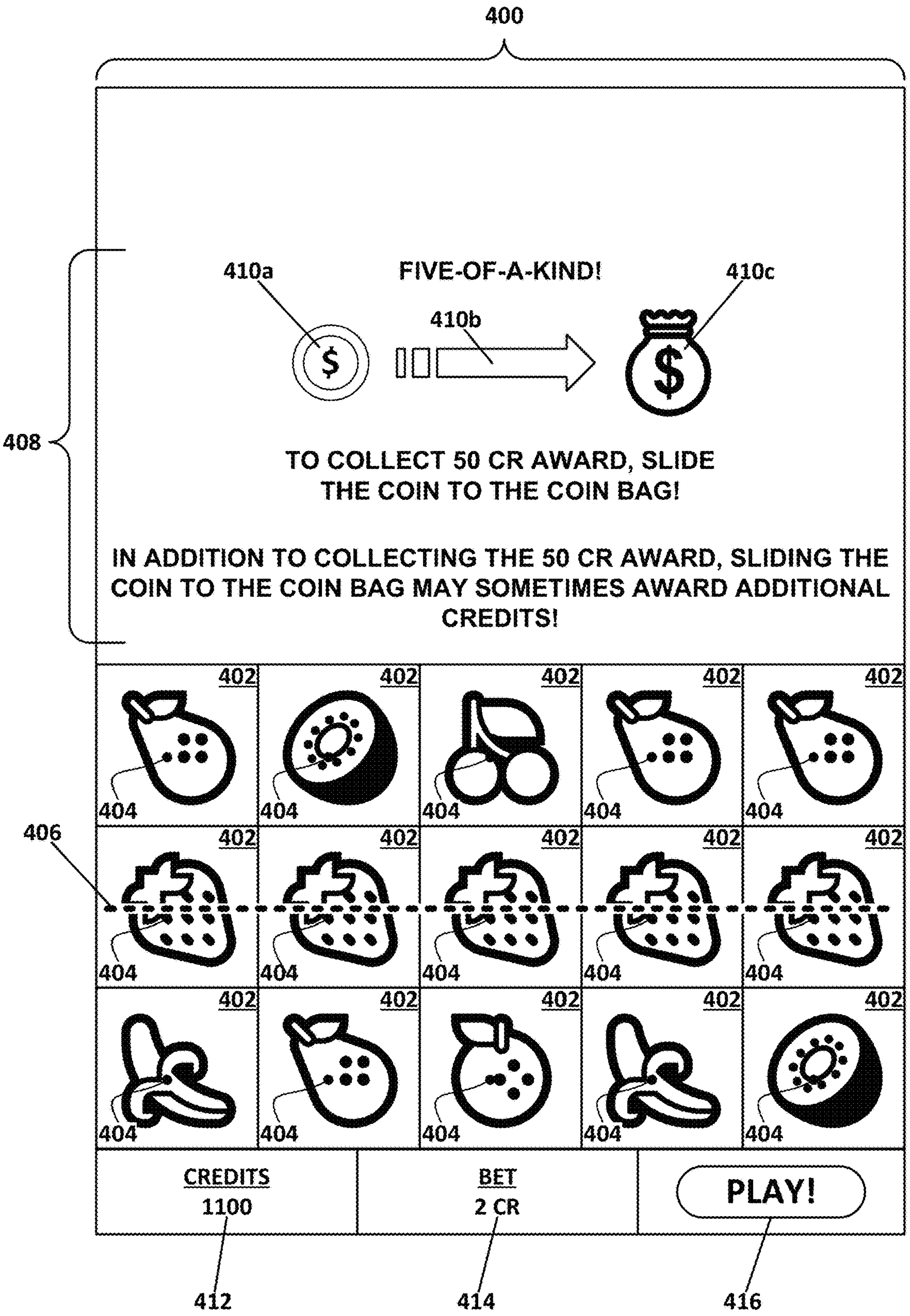
Figure 6:
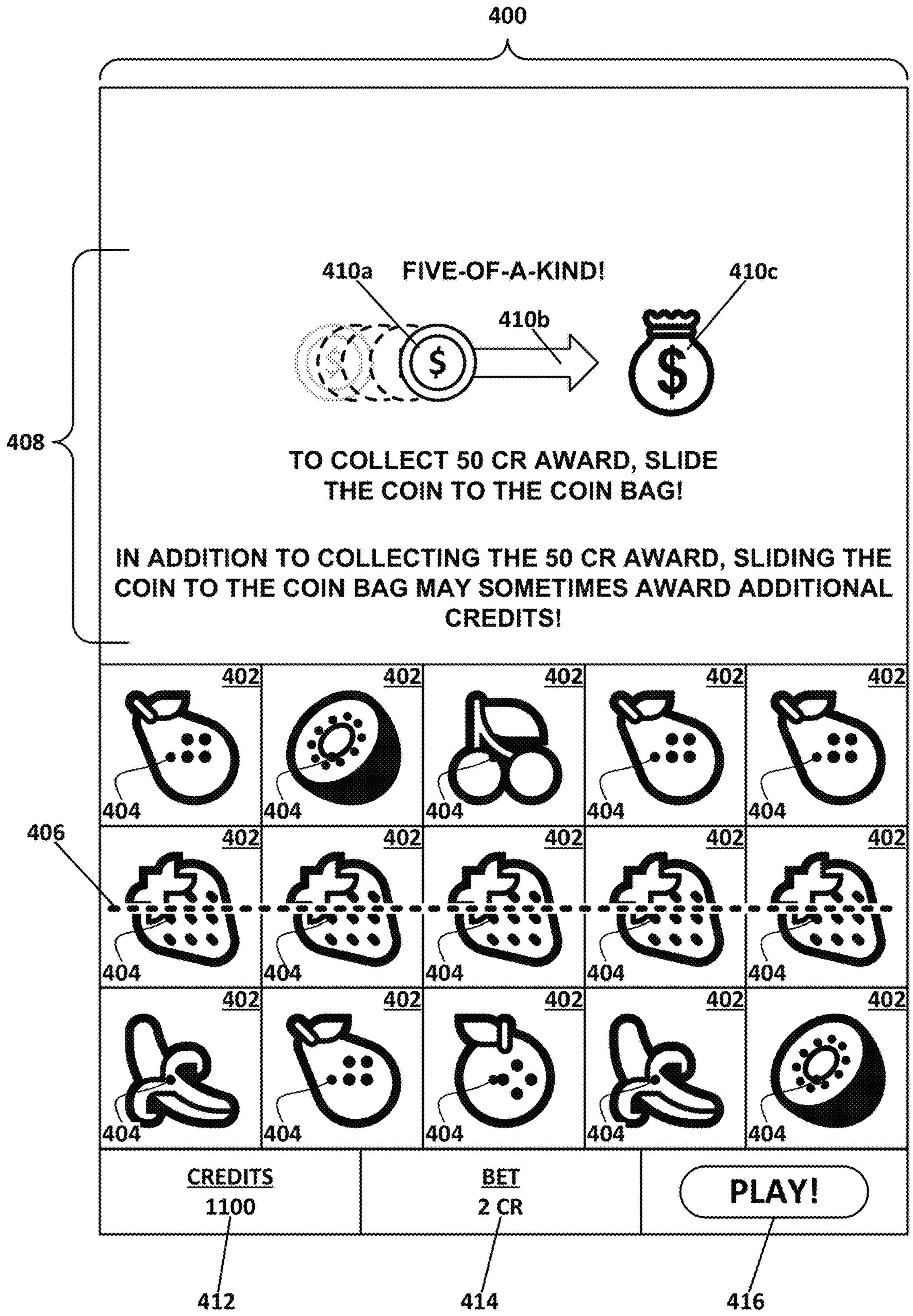
Figure 7:
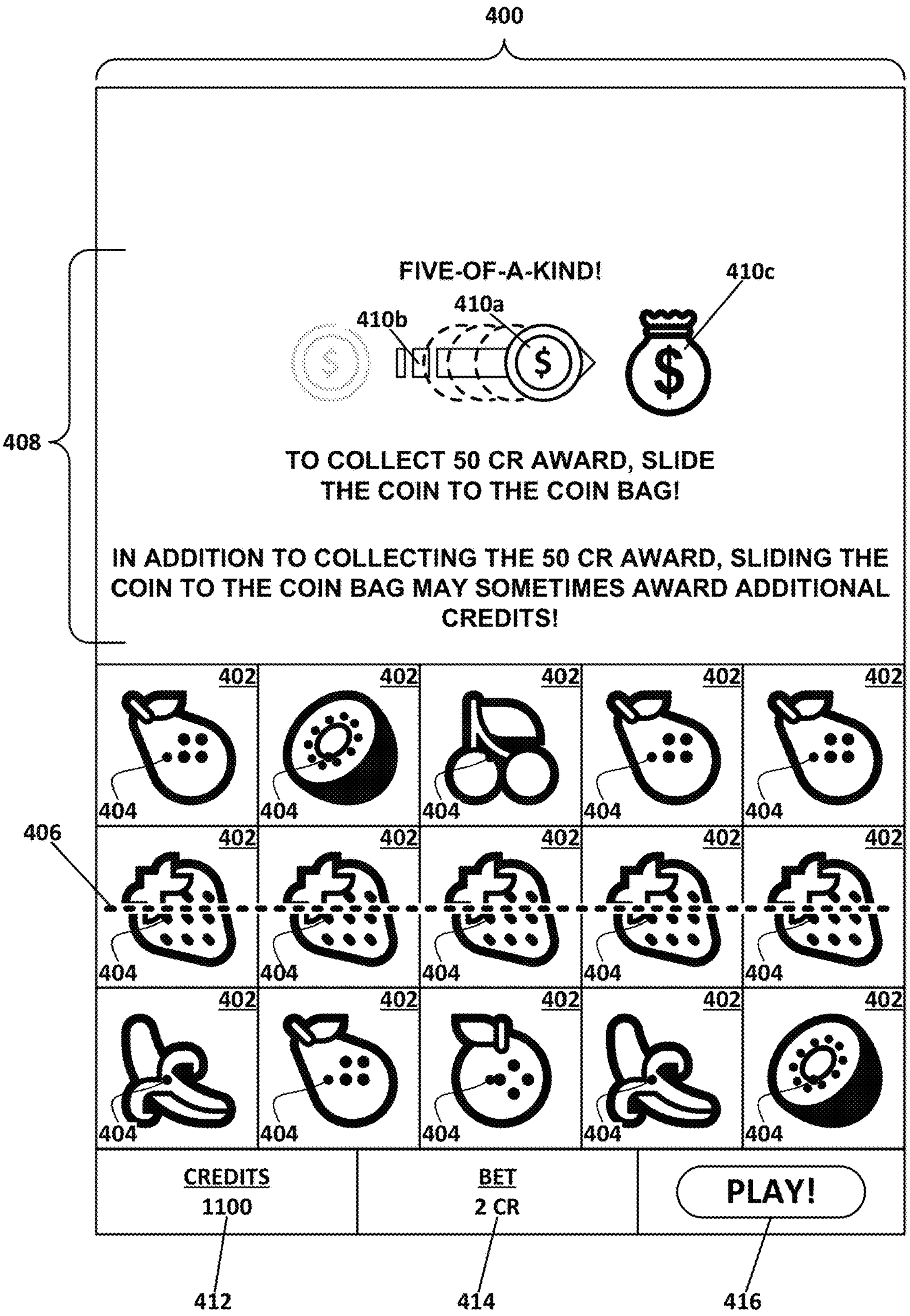
Figure 8:
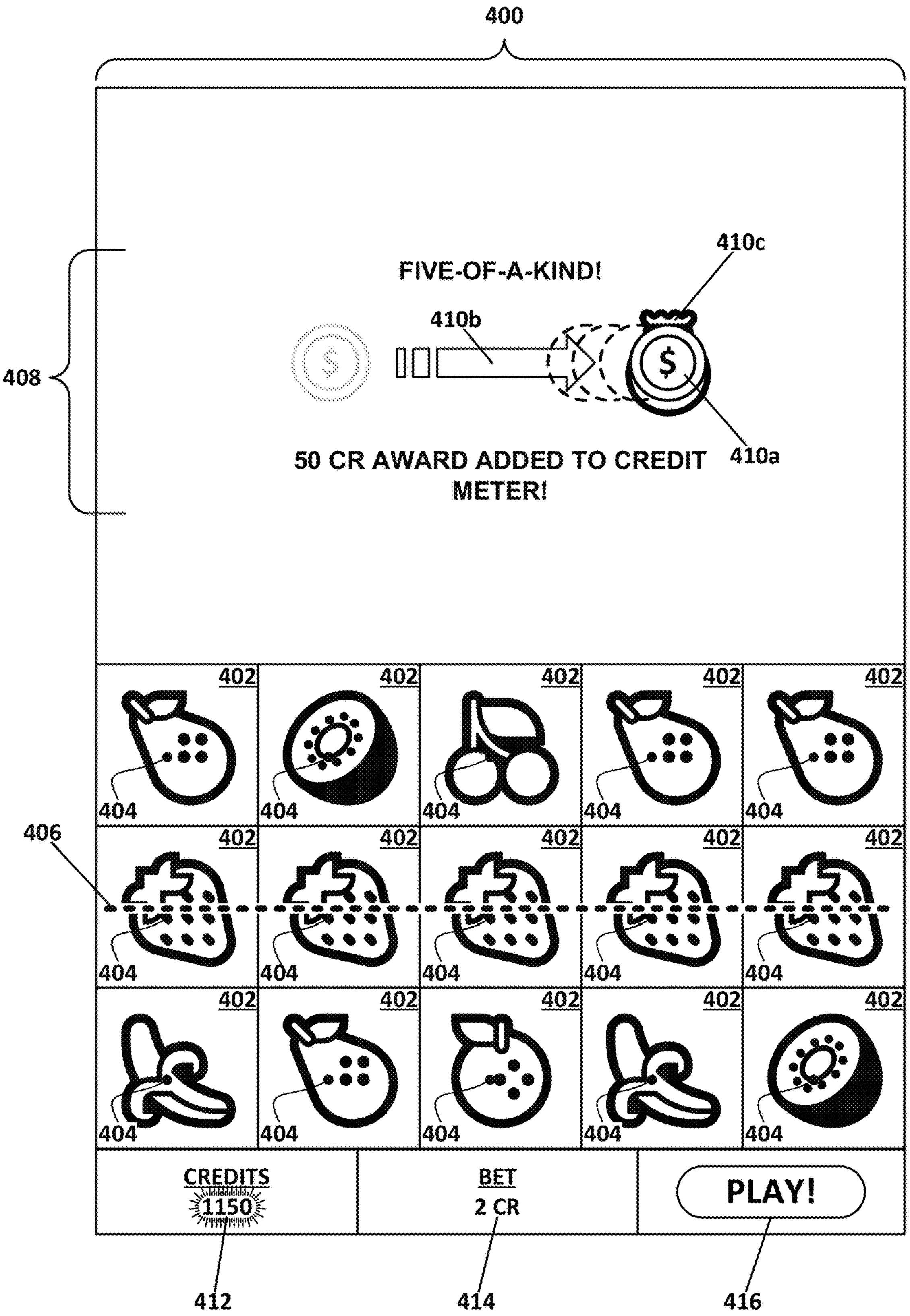

FIGS. 6 through 8 depict examples of how the task GUI element 408 of FIG. 5 may appear as the user interacts with the task GUI element 408, e.g., while dragging the sub-element 410*a* in the direction indicated by the sub-element 410*b* and then dropping the sub-element 410*a* on the sub-element 410*c*. In FIGS. 6 through 8, a "ghost" of the sub-element 410*a* (which may be a copy of the sub-element 410*a* that is made semi-transparent, greyed out, or otherwise de-emphasized) may be depicted in the location that the sub-element 410*a* is initially located at to allow the user to see how much progress they have made towards completing the interaction with the task GUI element 408. Depiction of a "ghost" version of a sub-element 410 is, however, understood to be entirely optional, and other implementations may not feature such depictions. FIGS. 6 through 8 also depict, via the broken-line outlines of the sub-element 410*a* that trail behind the sub-element 410*a*, a motion-blur effect that may be applied to the sub-element 410*a* as it is moved by the user towards the sub-element 410*c*.

In FIG. 8, the sub-element 410*a* has been moved by the user to a location in the task GUI element 408 corresponding to the sub-element 410*c*. Accordingly, the user has performed the interaction with the task GUI element 408 that is required in order to cause a task completion signal associated with the 50-credit award to be generated. The score or credit meter 412 of the GUI of the game of chance 400 has thus been caused to increment to reflect the award of 50 credits.

As discussed earlier, the gaming machine in this example is configured such that each time there is a successful completion of the task required by the task GUI element 408, there is the potential for an additional award to be provided. This additional award may be referred to herein as a task completion bonus to help differentiate it from the awards that, in being awarded, trigger requiring the interaction with the task GUI element 408. A determination as to whether or not a task completion bonus is to be awarded in association with the generation of the task completion signal may, as noted earlier, be made randomly in some implementations, but may, in other implementations, be made semi-randomly or even according to a preset schedule. Regardless, there will be instances in which a user successfully completes the interaction with the task GUI element 408 but is not provided with a task completion bonus. Generally speaking, the task completion bonus may be provided when a task completion bonus condition associated with the generation of a given task completion signal is met.

In some implementations, the task GUI element 408 may undergo various changes in state when the user successfully completes an interaction with the task GUI element 408. Such changes in state may, for example, include having the task GUI element 408 display an animation that is in some way linked to the "task" that the user just performed in order to successfully complete the interaction with the task GUI element 408. In some such implementations, the task GUI element 408 may be caused to change and stay in that altered state for at least one subsequent interaction with the task GUI element 408 responsive to a successful interaction with the task GUI element 408.

Figure 9:
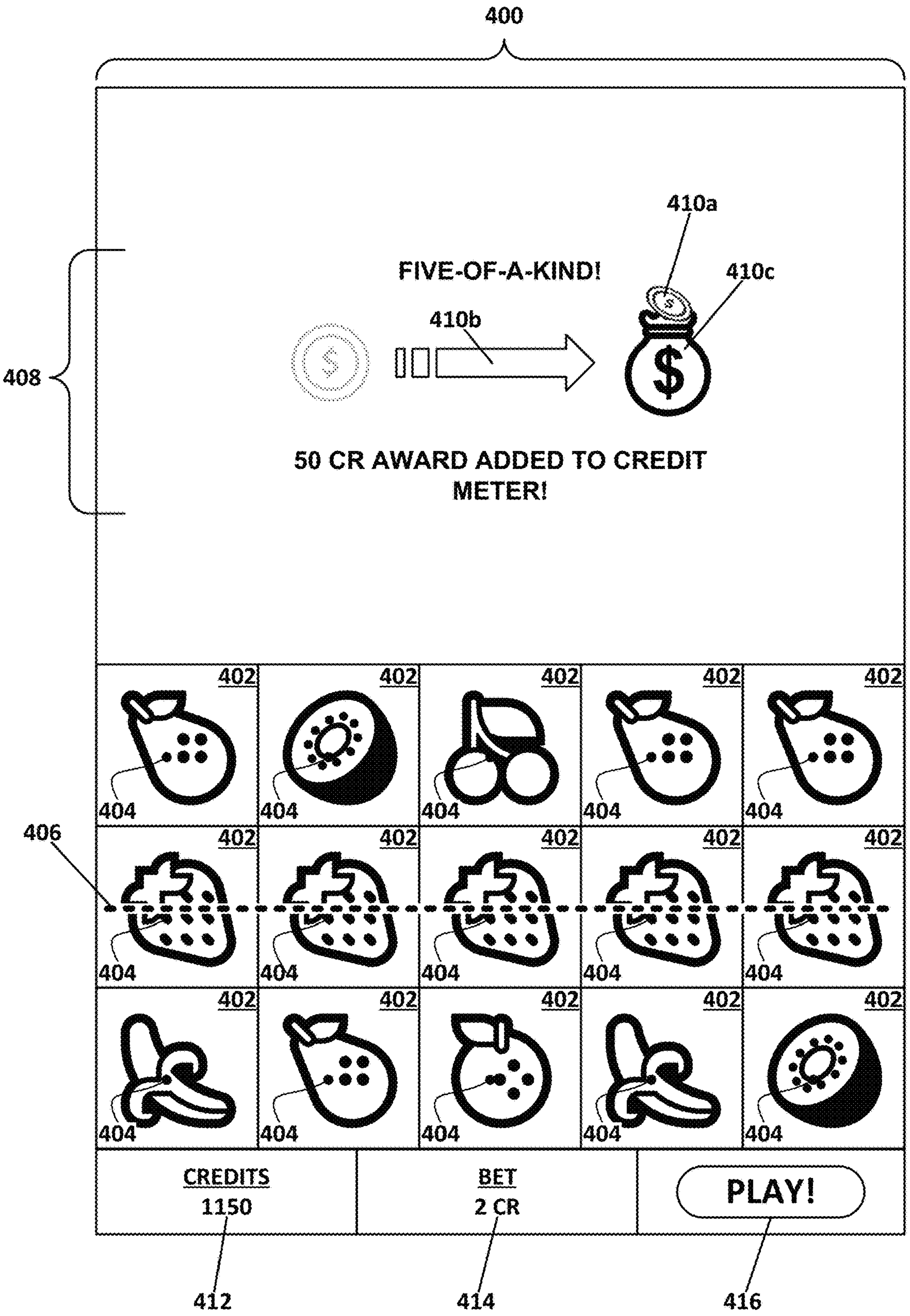
FIGS. 9 through 12 depict the GUI for the game of chance of FIGS. 4 through 8 as a sub-element of a task GUI element is caused to transition from a first graphical state to a second graphical state.
Figure 10:
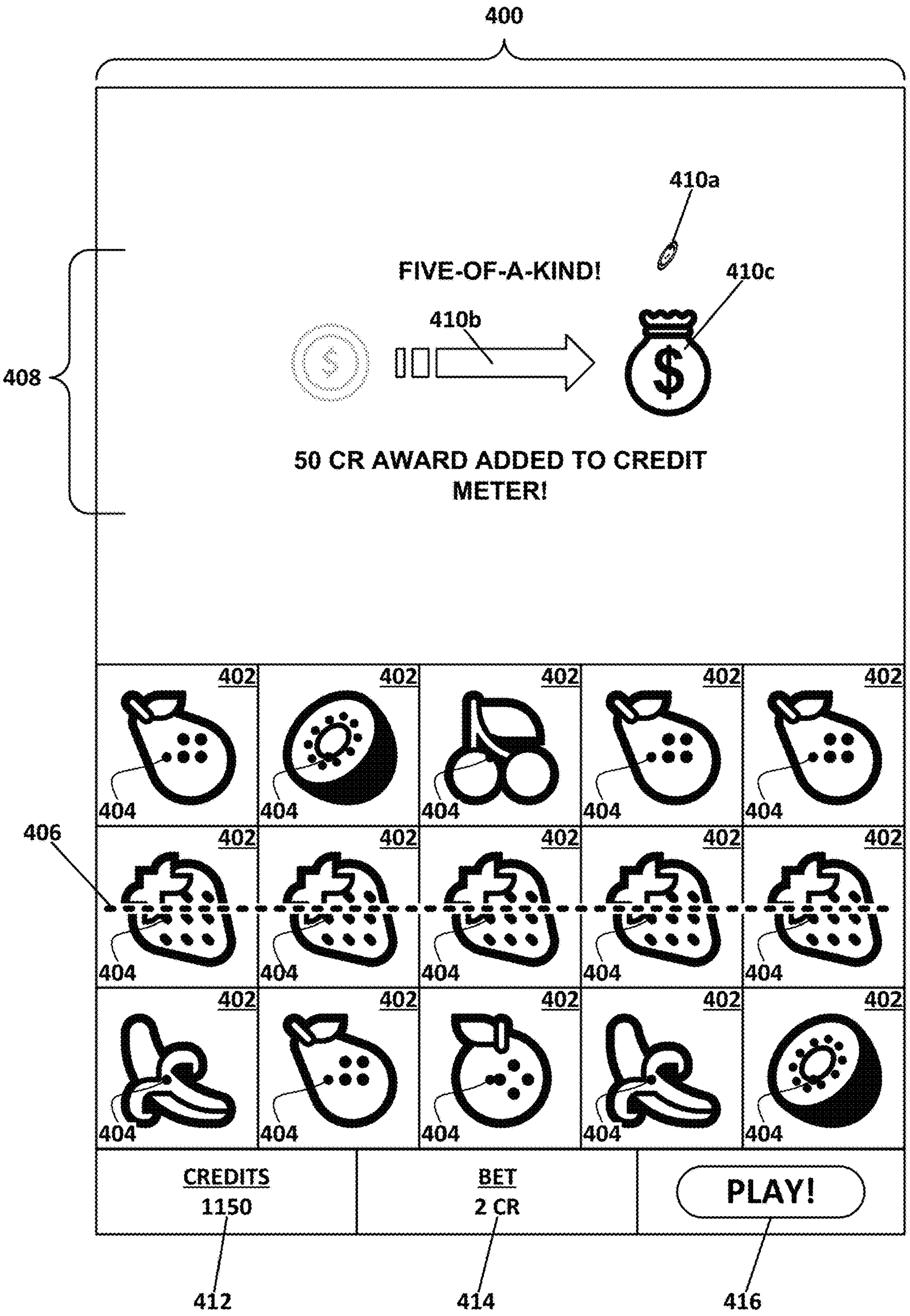
Figure 11:
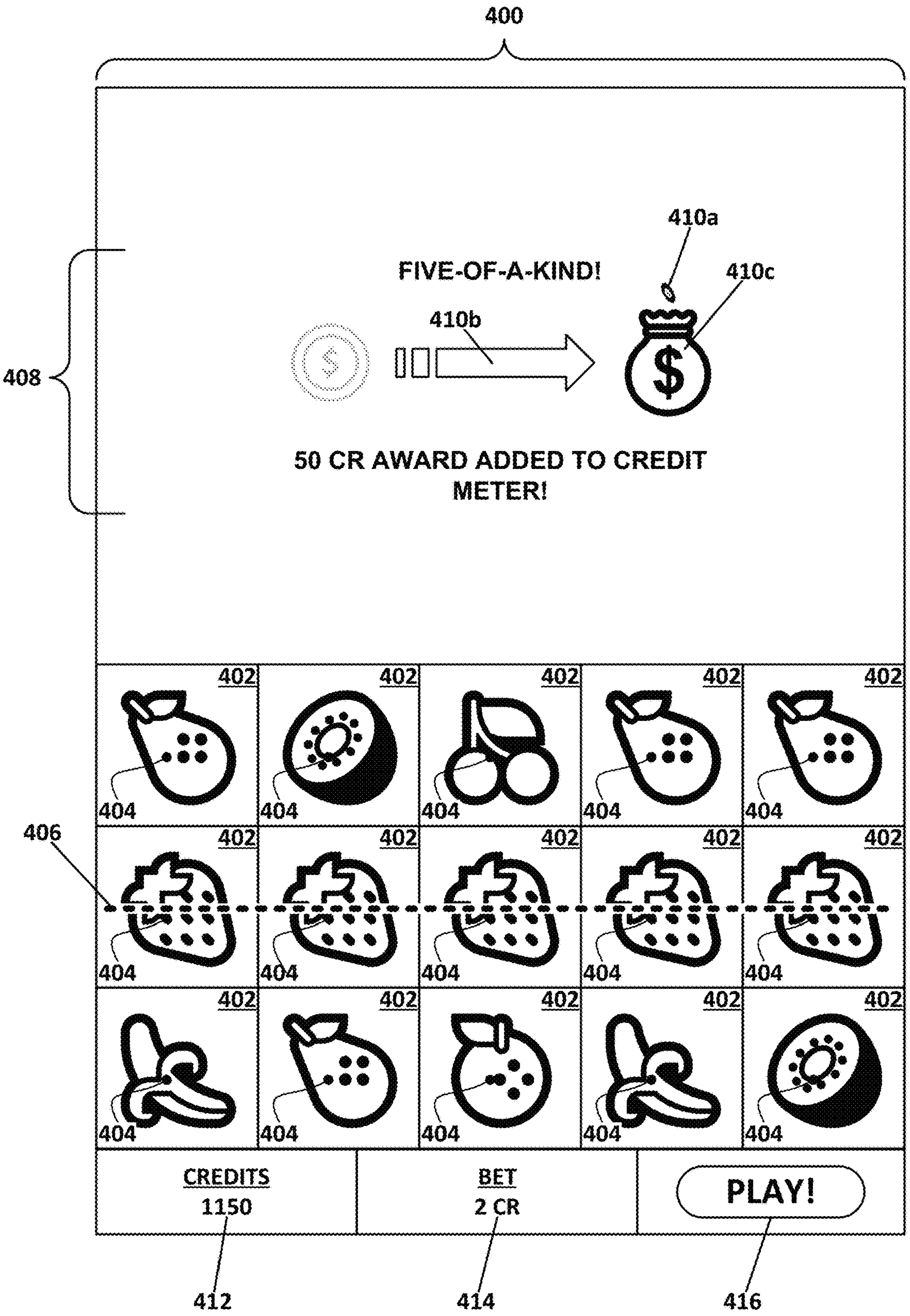

For example, FIGS. 9 through 11 depict the GUI for the game of chance of FIGS. 4 through 8 during display of an animation that is played responsive to a task completion signal being generated. The animation that is displayed, in this example, is that of the sub-element 410*a* flipping up in the air, turning end over end, and then falling into the sub-element 410*c*, e.g., representing a coin flipping end over end and into a coin bag. In some implementations, such an animation may be displayed in association with each task completion signal that is generated.

In some instances, there may be a sub-element 410 of the task GUI element 408 that may, in some circumstances, undergo a change in graphical state in association with generation of a task completion signal. For example, if the task GUI element 408 includes a sub-element 410, e.g., the sub-element 410*c*, into which the user is required to move another sub-element 410, e.g., the sub-element 410*a*, then the sub-element 410 that receives the sub-element 410 that is caused to move may be caused to, on occasion, grow in size to reflect the increasing number of successful task GUI interactions that the user may have accomplished. This may provide a visual indication to the user that suggests that the sub-element 410 in question is under increasingly greater pressure and is thus more likely to "burst" or "explode" and provide a task completion bonus. Once a task completion bonus is actually awarded as the result of a successful task GUI interaction, the graphical state of such a sub-element 410 may be reset to a default or initial state. It will be understood that in implementations where determinations that the task completion bonus condition is met are based on random outcomes, the apparent growth or enlargement of a sub-element 410 will be more of a statistical indication of the likelihood of the task completion bonus condition being met as opposed to a concrete indication of the likelihood of the task completion bonus condition being met.

Figure 12:
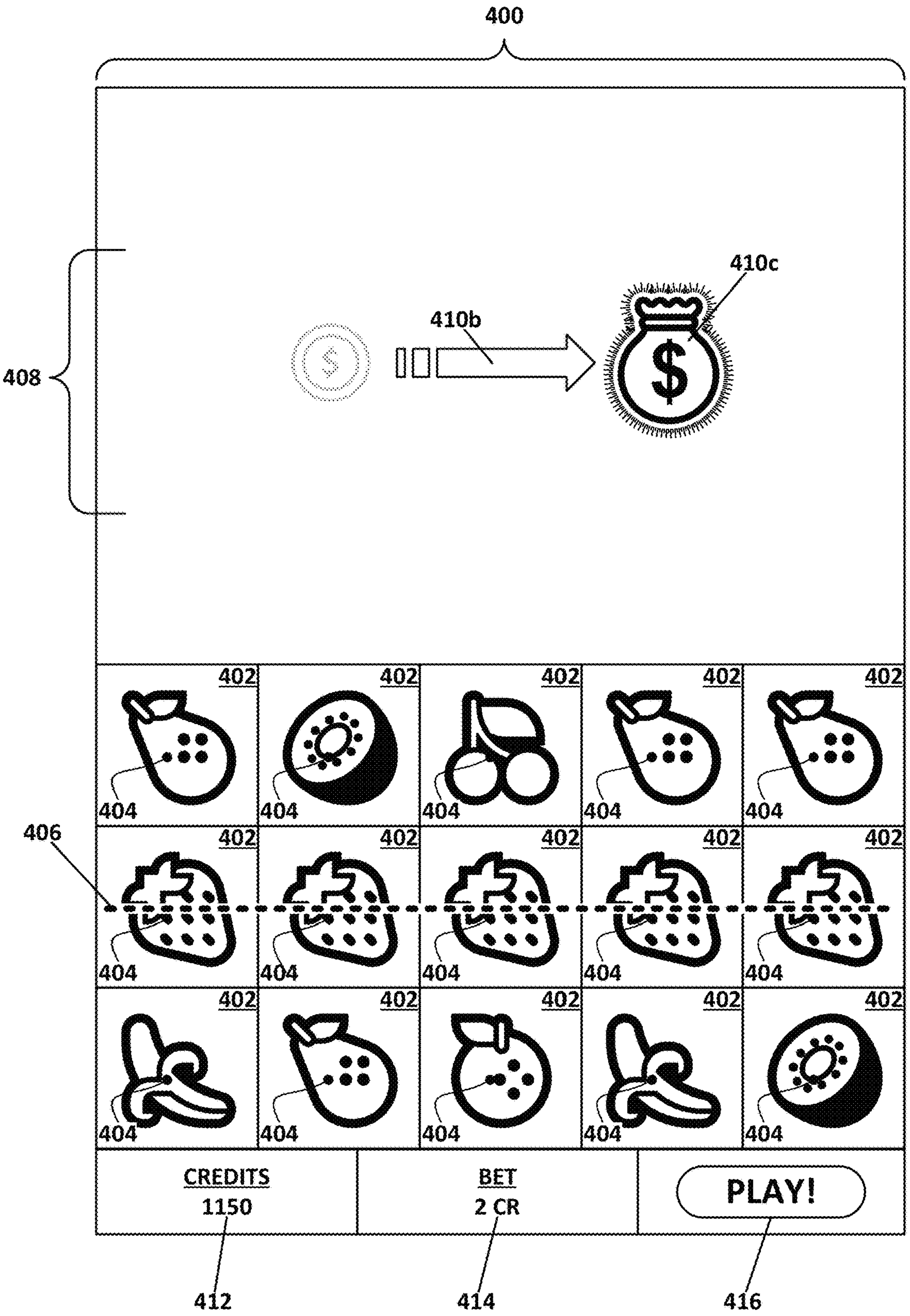
Figure 13:
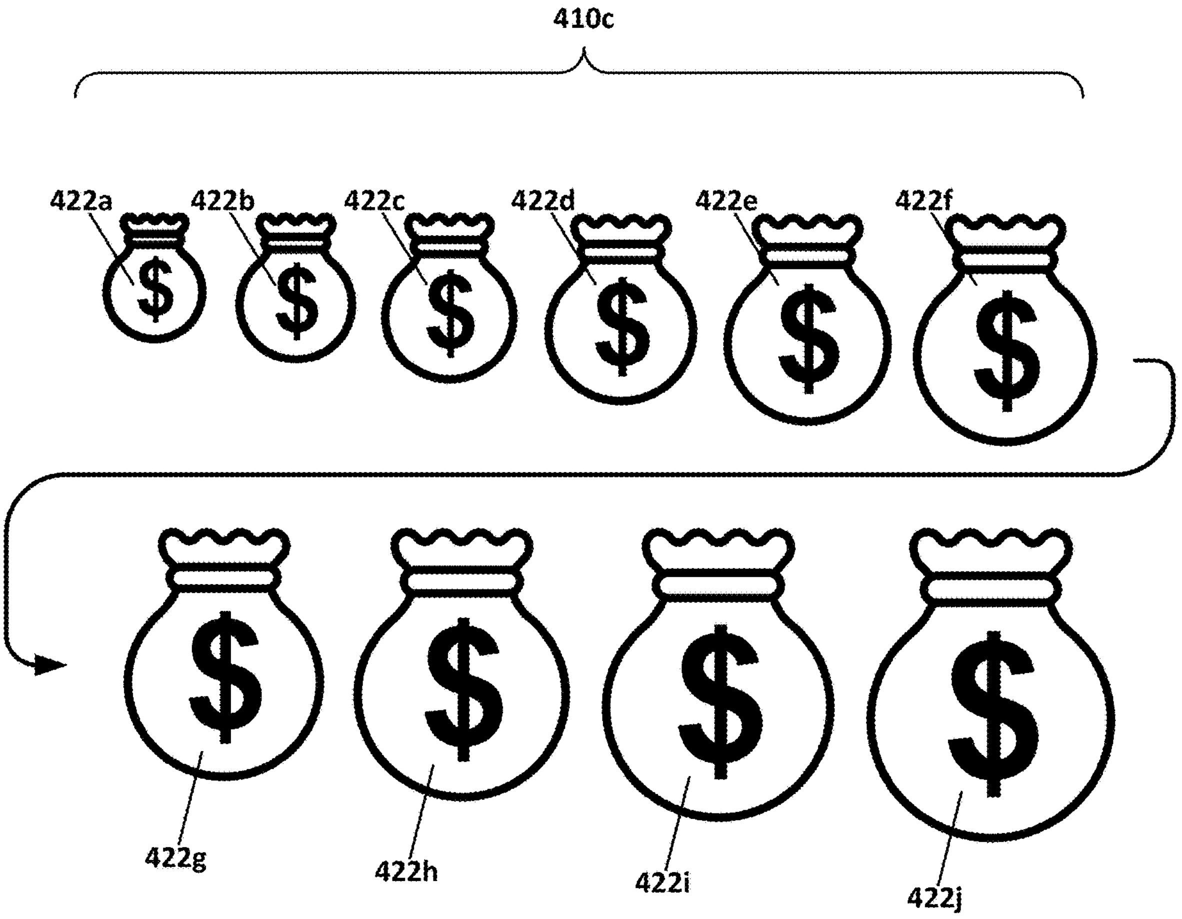
FIG. 13 depicts an ordered sequence of graphical states for a sub-element of a task GUI element.

FIG. 12 depicts the task GUI element 408 transitioning to a state in which the sub-element 410*c* of the task GUI element 408 from FIG. 11 is caused to transition from a first graphical state to a second graphical state, e.g., a larger size. FIG. 13 depicts the sub-element 410*c* in various graphical states 422, e.g., 422*a* through 422*j*. The graphical states 422*a* through 422*j* are, it will be observed, increasingly larger in size, e.g., they represent an ordered sequence of graphical states. In implementations in which a sub-element 410 is caused to undergo one or more changes in graphical state, such changes may be initiated based on a variety of triggers. For example, in some implementations, changes in graphical state may be initiated once particular numbers of task completion signals since the last time a task completion bonus was awarded have been generated, e.g., after 20, 40, and then 60 task completion signals have been generated since the last time a task completion bonus was awarded have been generated. In other implementations, whether or not such a change in graphical state is to happen in association with generation of a given task completion signal may be randomly determined. In some such implementations, the random determination that is made may be a weighted random determination in which the weighting may be adjusted to make it more likely that a change in graphical state will occur in association with generation of a task completion signal as more and more task completion signals are generated that do not result in such a change in graphical state.

Put more generally, a sub-element 410 that is in the task GUI element 408 and that has a graphical state that is drawn from an ordered sequence of graphical states 422 may, responsive to each generation of one of the task completion signals in a subset (e.g., the $20^{th}$, $40^{th}$, $60^{th}$, etc. task completion signals) of a plurality of the task completion signals that are generated, be caused to change its graphical state to transition to a next graphical state in the ordered sequence of graphical states. In some instances, the subset may be inclusive of all of the task completion signals in the plurality of task completion signals, i.e., every generation of a task completion signal may cause a corresponding change in graphical state for the sub-element. However, in most implementations, changes in graphical state of a sub-element may occur more sporadically.

The examples in FIGS. 4 through 12 depict the task GUI element 408 during various stages of operation, e.g., when the task GUI element 408 is interacted with by a user in a successful manner, thereby resulting in the award that caused the user to have to interact with the task GUI element 408 in the first place being added to the credit meter 412, but do not reflect what may occur when a task completion bonus condition associated with a particular bonus task completion signal is actually met.

Figure 14:
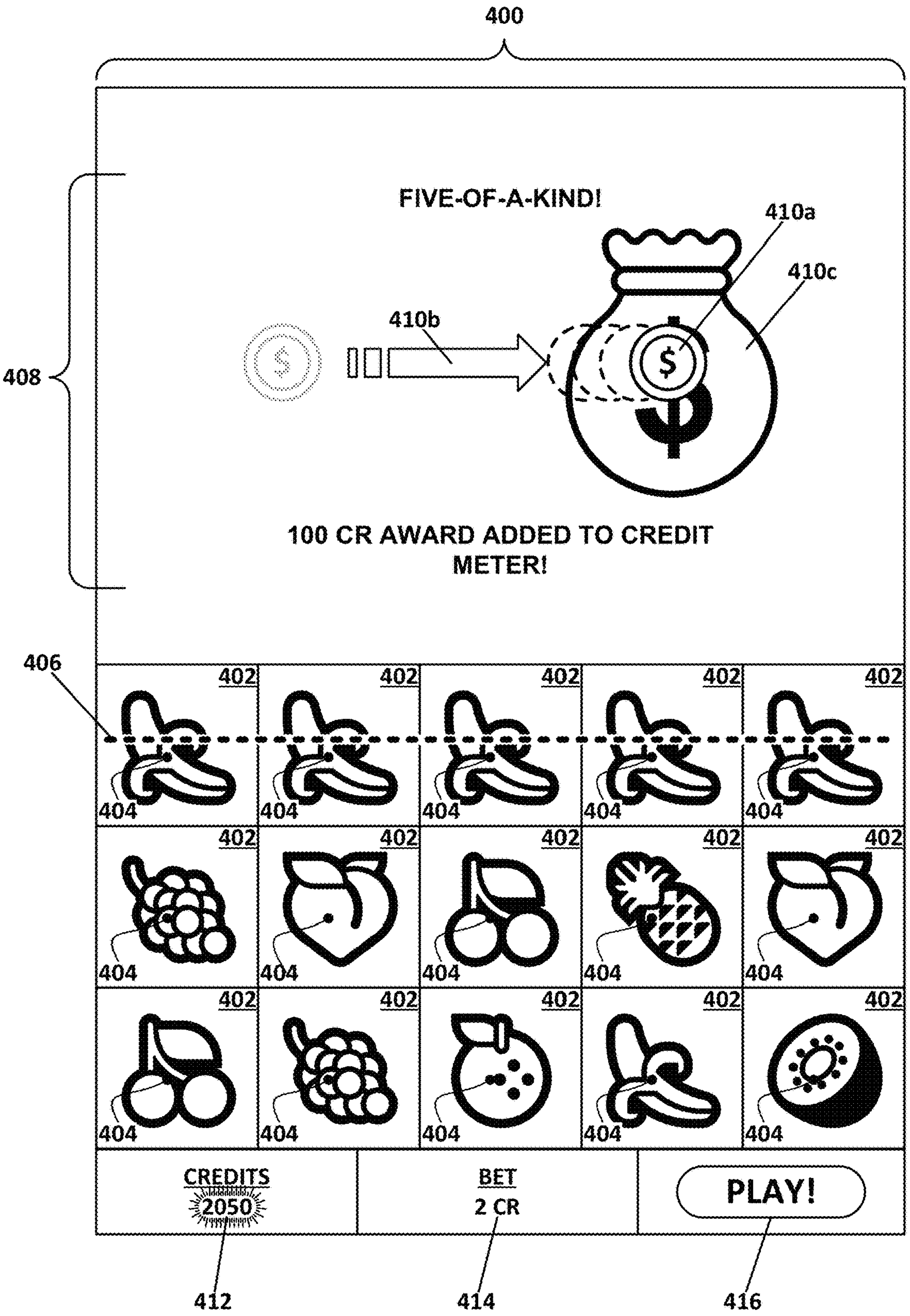
FIGS. 14 and 15 depict the GUI for the game of chance of FIGS. 4 through 8 during various states of an award animation.
Figure 15:
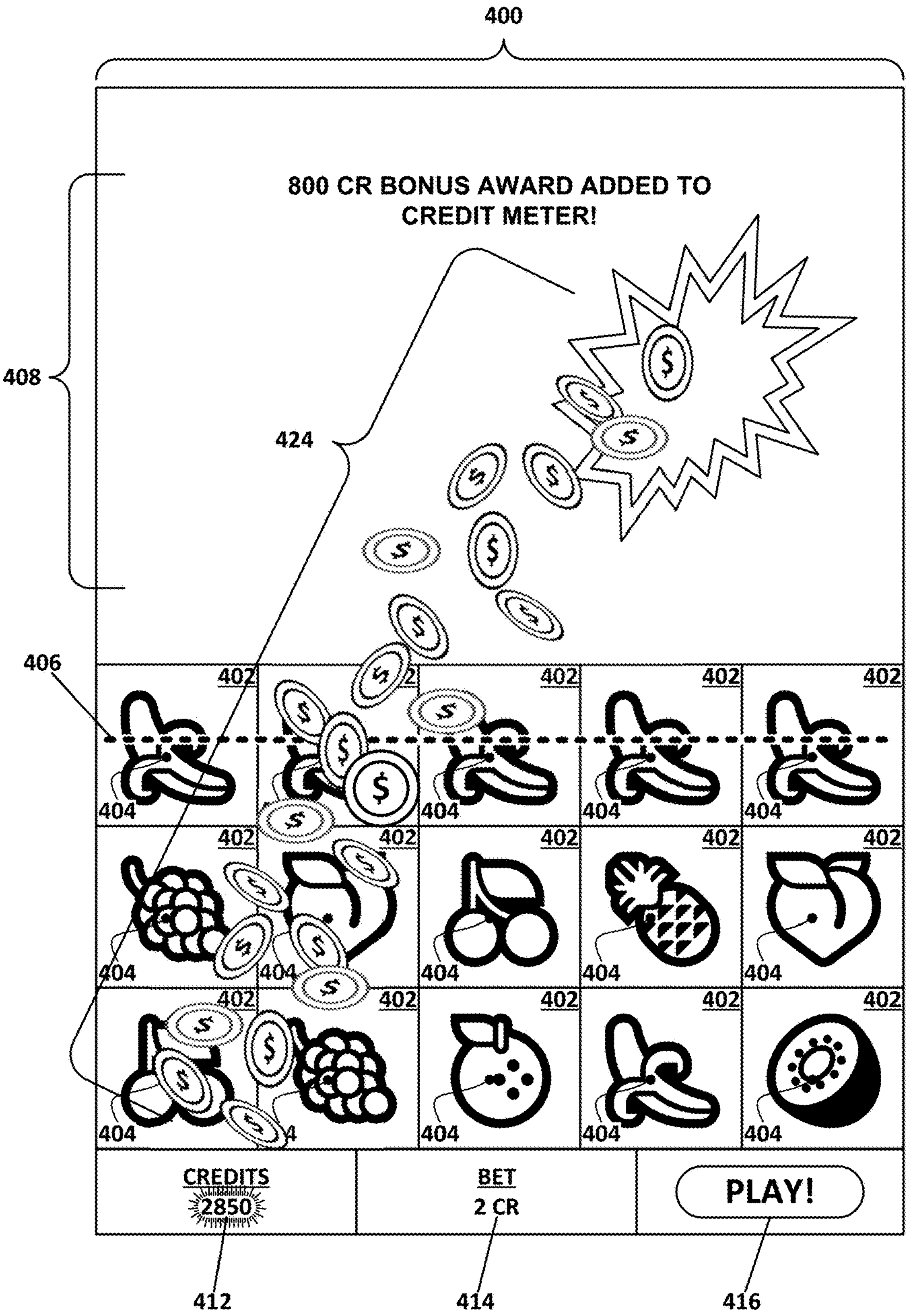

FIGS. 14 and 15 depict the GUI for the game of chance of FIGS. 4 through 8 when a determination is made that a task completion bonus condition associated with a bonus task completion signal is met. As shown in FIG. 14, a game outcome has been generated that includes a five-of-a-kind winning pattern of symbols 404 in the top row of symbol positions 402 (symbol positions 402 along payline 406). In this example, the user has already interacted with the task GUI element 408 by dragging the sub-element 410*a* to the sub-element 410*c*. As can be seen, the sub-element 410*c* has grown significantly larger than the graphical state shown in FIG. 12, reflecting that multiple additional awards have been earned and provided to the user responsive to a corresponding number of successful user interactions with the task GUI element 408 since the award provided to the user from the game play depicted in FIG. 12. In this case, the five banana symbols 404 shown along the payline 406 result in a 100 credit award being added to the score or credit meter 412 once the user has successfully interacted with the task GUI element 408, as shown in FIG. 14 (the score or credit meter 412 now shows 2050 credits, but would have shown 1950 credits prior to the user successfully interacting with the task GUI element 408).

In this example, the gaming machine has determined, in association with the generation of the task completion signal caused by the successful interaction of the user with the task GUI element 408 of FIG. 14, that the task completion bonus condition has been met. As noted earlier, this may be a random determination, e.g., a random determination is made for each task completion signal that is generated as to whether or not the task completion bonus condition is met, or may be a non-random determination (or a blend of random and non-random, e.g., non-random or random up to a particular number of sequential instances in which the task completion bonus condition us not met, and then random or non-random after that. For example, the first X determinations (since the last determination that the task completion bonus condition was met) as to whether or not the task completion bonus condition is met may be automatically set to "false," but for the $(X+1)^{st}$ such determination onward, such determinations may be randomly determined, i.e., there may not be a preordained outcome to such determinations. This may ensure that there is at least a minimum number of task completion signals generated since the last time the task completion signal was generated before the next time a task completion bonus is awarded. Similarly, the first X such determinations may be made randomly made (since the last determination that the task completion bonus condition was met), but if the task completion bonus condition has not been met by the Xth such determination, then the $(X+1)^{st}$ such determination may be automatically set to "true," thereby ensuring that there will be at least one task completion bonus provided within a given interval.

When it is determined that the task completion bonus condition is met, the task GUI element 408 may be caused to update to reflect that the user has, in interacting with the task GUI element 408, caused an additional task completion bonus to be provided to them. For example, the task GUI element 408 may be caused to update to indicate the nature of the task completion bonus, e.g., via text such as "800 CR BONUS AWARD ADDED TO CREDIT METER!." The task GUI element 408 may also or alternatively be caused to display an award animation 424 that may convey to the user that the task completion bonus is being provided to the player. For example, in FIG. 15, the award animation involves the sub-element 410*c* exploding (as represented by the explosion graphic that has replaced the sub-element 410*c* from FIG. 14) and a cascade of sub-elements 410*a*, e.g., coins, raining down from the former location of the sub-element 410*c* and into the score or credit meter 412. The score or credit meter 412 has also been caused to be updated to reflect the addition of the task completion bonus.

In some implementations, the award animation may involve, in some way, a sub-element that was previously caused to change graphical state, e.g., as discussed earlier. For example, if a sub-element is caused to grow in size over time in response to generation of multiple instances of the task completion signal, when the task completion bonus condition is finally met and the task completion bonus is provided, the sub-element (as in FIG. 15) that was caused to change graphical states may be caused to participate in the award animation, e.g., in FIG. 15, the sub-element 410*c* is caused to explode.

The task completion bonus may, as noted earlier, take a variety of forms. In some instances, the task completion bonus may be an amount of points or credits that are added to the user's score or credit meter 412. In other implementations, the task completion bonus may be a benefit that the user may take advantage of in a subsequent game play, e.g., a multiplier that will be applied to the next winning outcome that the user may obtain (or that the user may retain in reserve and then actively elect to have applied to a particular future outcome), a free plays feature granting the player some predetermined number of free plays of the game of chance, a "wilds" feature in which a designated non-wild symbol is instead treated as a wild symbol (matching any other symbol) for the purposes of determining winning outcomes along paylines, etc. In yet other implementations, the task completion bonus may be a bonus game that may provide any of the above-discussed benefits, but with an additional element of randomness and suspense for the user. For example, in such implementations, a determination that the task completion bonus condition is met may cause the gaming machine to cause a bonus game GUI to be displayed, thereby allowing the user to play the bonus game to determine the actual bonus that will be provided.

Figure 16:
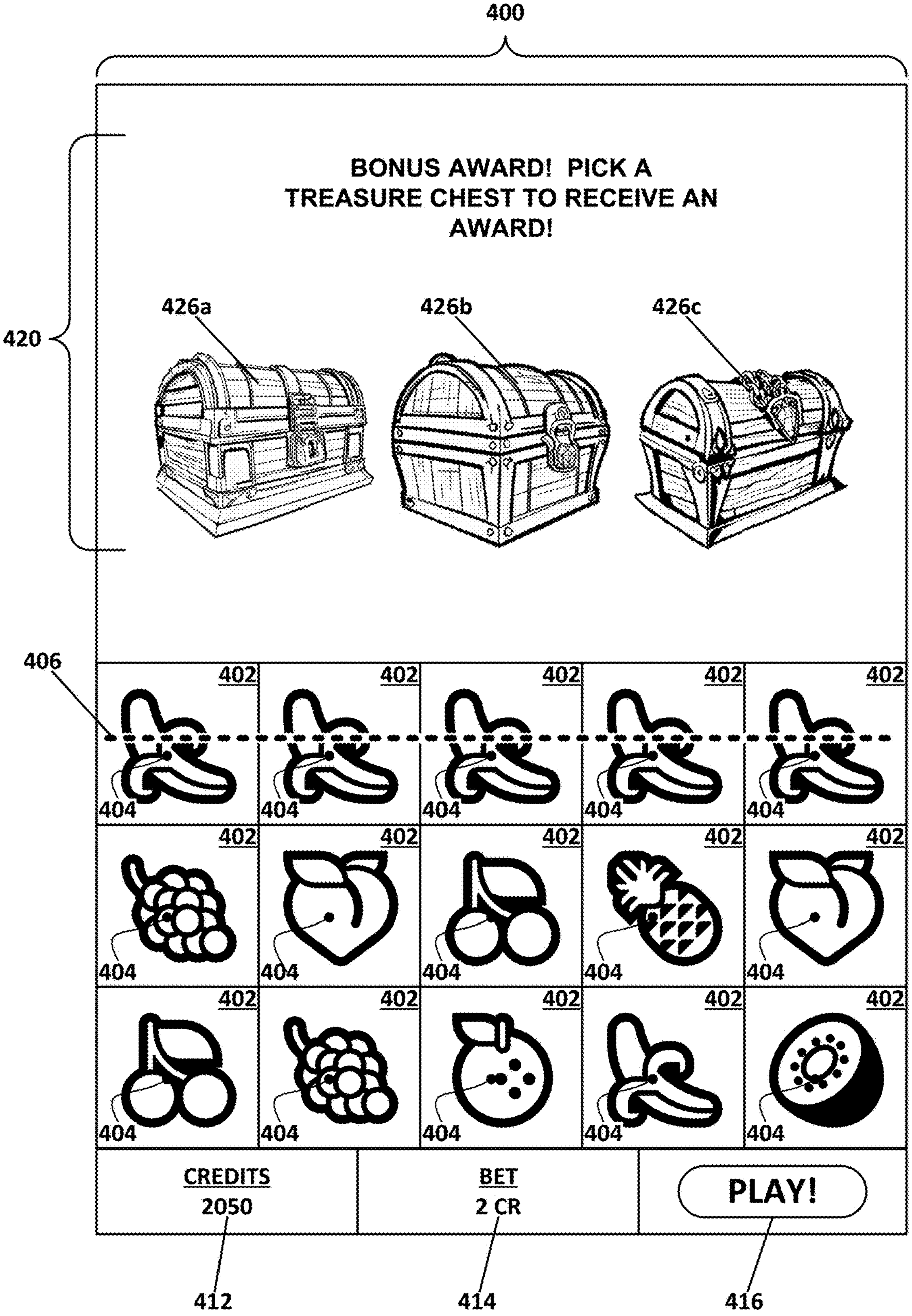
FIGS. 16 through 19 depict a bonus game GUI that may be displayed responsive to a successful interaction by a user with a task GUI element.

FIGS. 16 through 19 depict a bonus game GUI that may be displayed responsive to a successful interaction by a user with a task GUI element and in response to a determination that the task completion bonus condition has been met. As can be seen in FIG. 16, a bonus game GUI 420 has been caused to be presented as part of the GUI for the game of chance 400. It will be appreciated that the bonus game GUI 420 may also be caused to simply replace all of the GUI for the game of chance 400 in some implementations.

The bonus game GUI 420 is a "pick-one" bonus game in which the user is presented with a plurality of selectable options, e.g., options 426*a*, 426*b*, and 426*c*. In this example, there are three options 426, each of which is represented by a graphic of a treasure chest, but other implementations may feature other numbers of options and/or other graphical representations of the options. At least one of the selectable options 426 is associated with an additional award, such as additional points or credits, enhancements that may be used in a subsequent game play, etc. In many implementations, however, all of the selectable options may be associated with a bonus game award amount that will be used to provide the task completion bonus, i.e., the user will be provided with at least some additional award no matter what option the user selects. The bonus game GUI 420 may include, for example, instructions to the user instructing them on how to proceed ("BONUS AWARD! PICK A TREASURE CHEST TO RECEIVE AN AWARD!").

Figure 17:
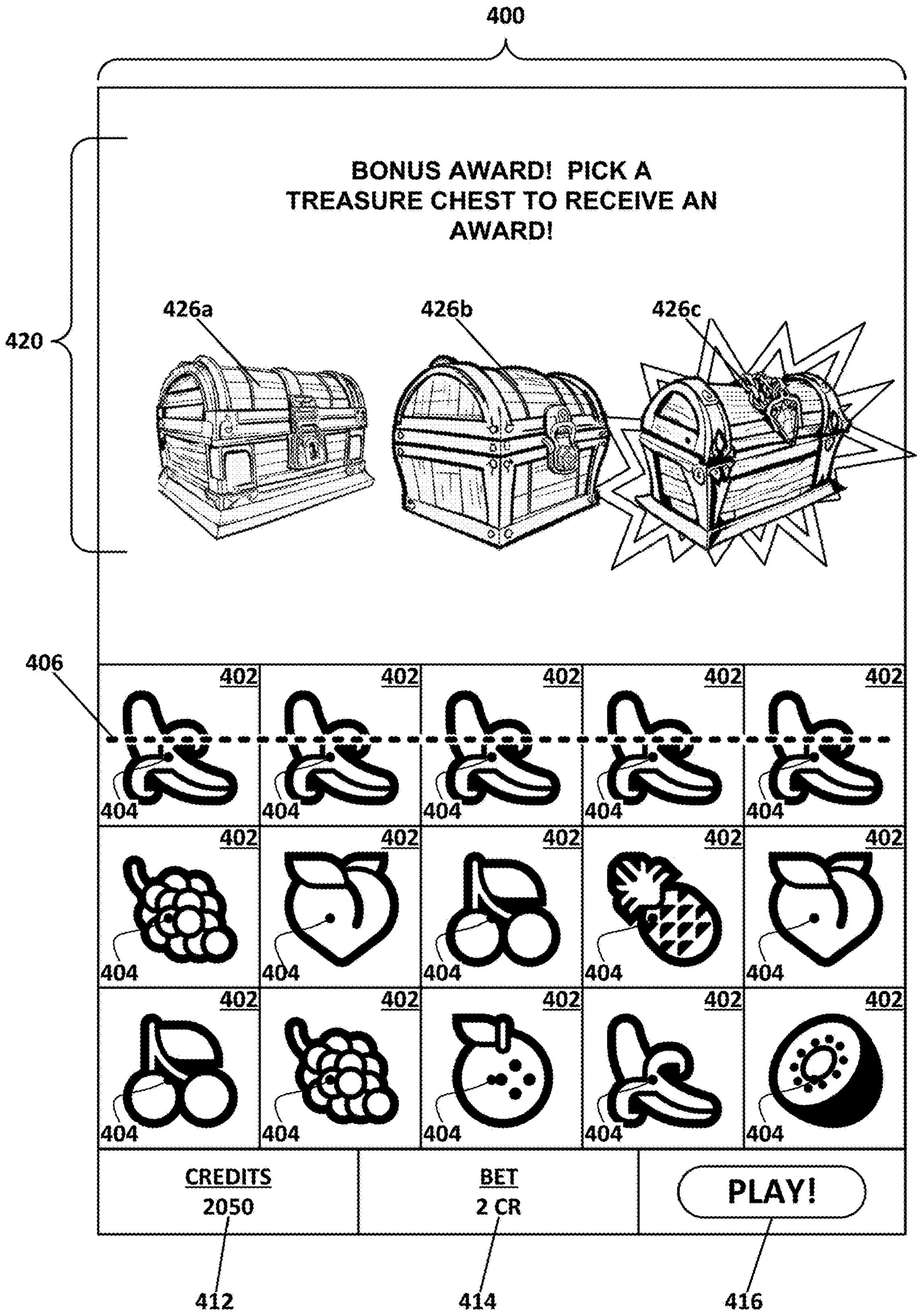
Figure 18:
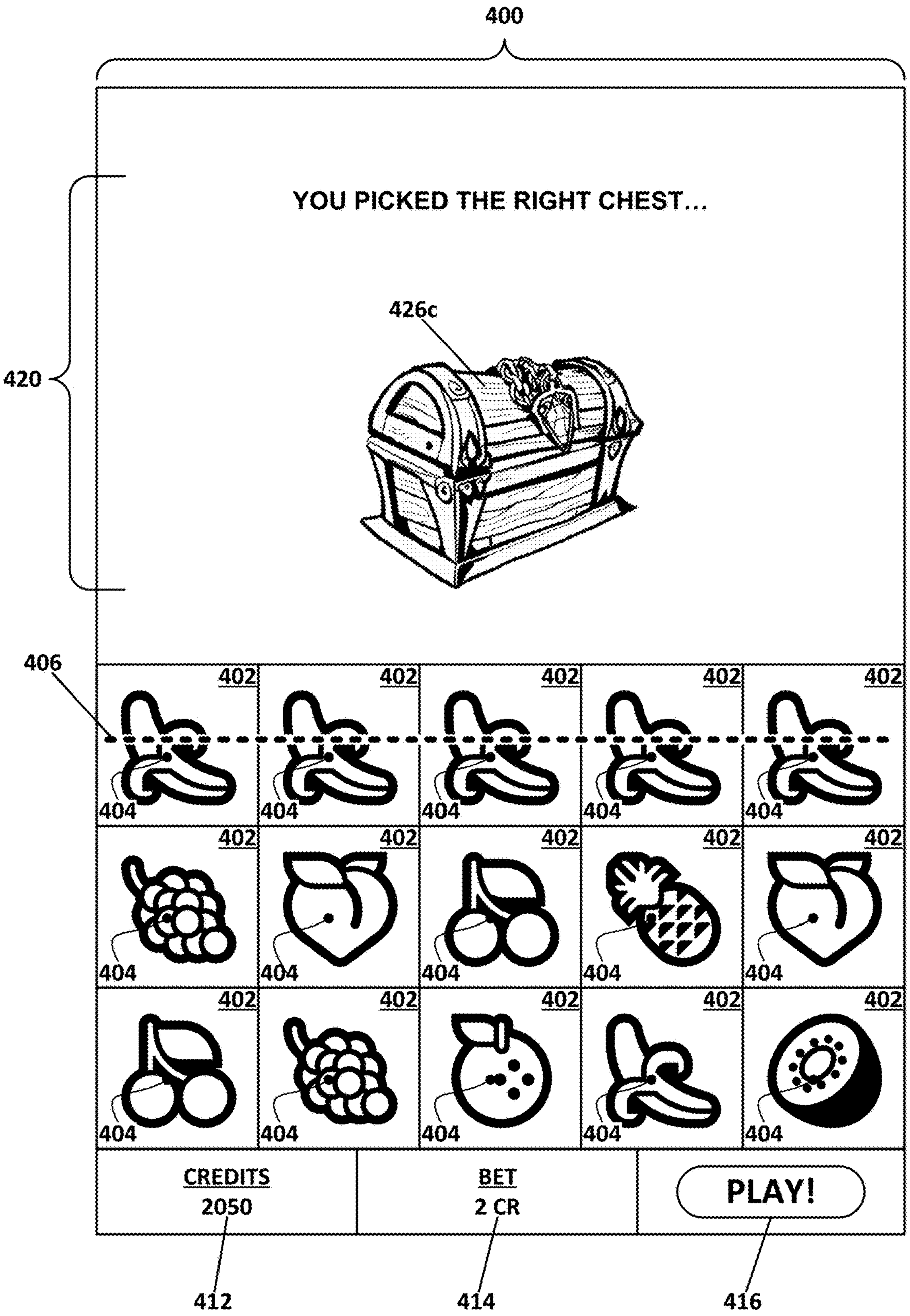
Figure 19:
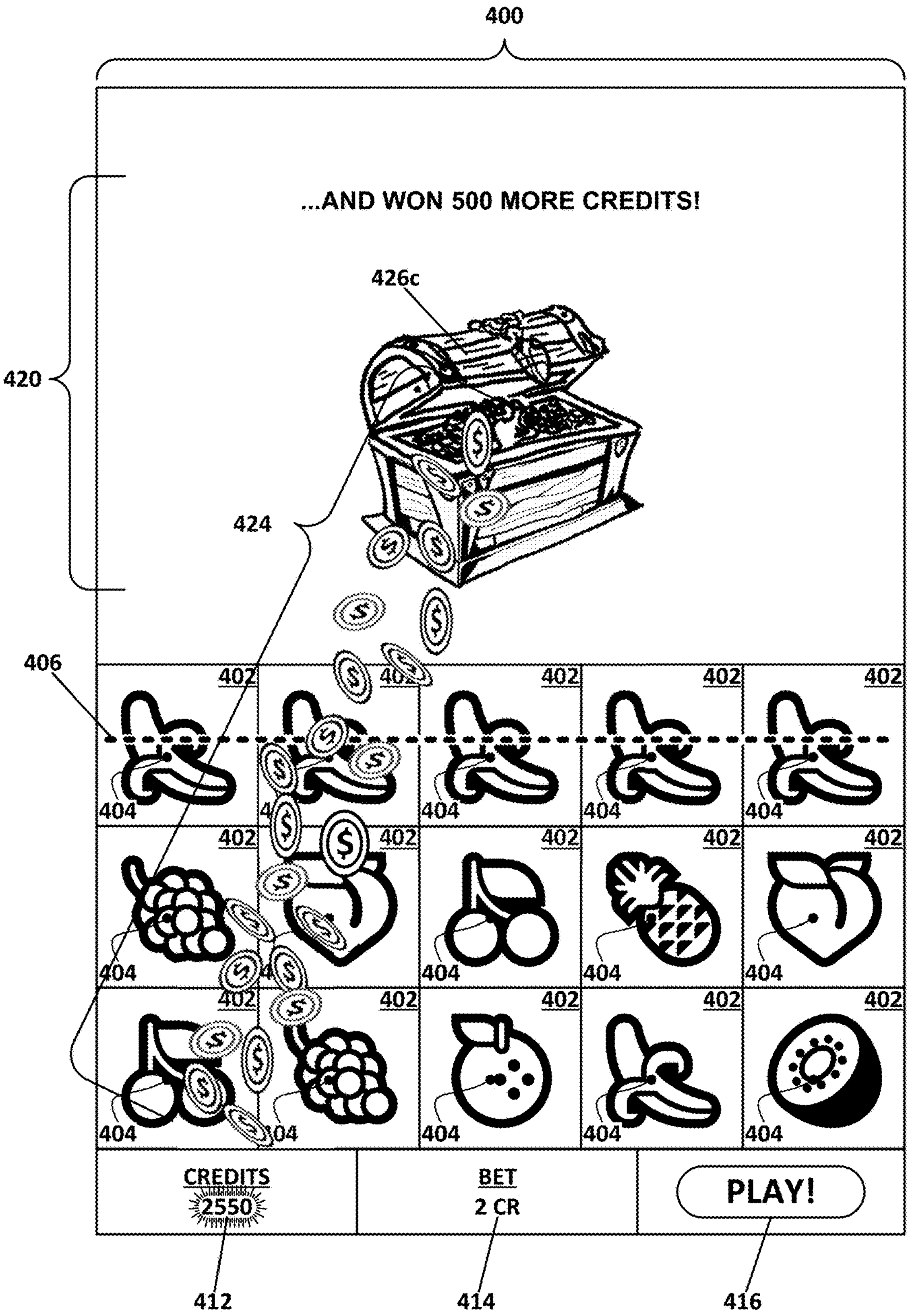

In FIG. 17, the user has selected the rightmost option 426*c*, e.g., by providing a touch input corresponding in location to the option 426*c*. The bonus game GUI 420 may, for example, provide feedback as to the selection made (e.g., "YOU PICKED THE RIGHT CHEST . . . "), and may then, in some cases (and as shown) move the selected option 426*c* such that it is centered in the bonus game GUI 420. In FIG. 19, the selected option 426*c* is caused to undergo an animation, e.g., the treasure chest graphic that represents the selected option 426*c* is caused to animate to show the treasure chest opening, and an indication may be made as to the nature of the award that the user has been awarded, e.g., " . . . AND WON 500 MORE CREDITS!"). The award animation 424 may, for example, be caused to play in the bonus game GUI 400 to represent the award flowing from the selected option 426*c* into the score or credit meter 412.

As noted above, the determination as to whether a task completion bonus condition is met may be a random determination or may be a non-random determination. For example, in some cases, a gaming machine implementing a task GUI element may be configured to determine that the task completion bonus condition is met whenever a specified number of task completion signals have been generated since the last time the task completion bonus condition was met. For example, a gaming machine may be configured to determine that the task completion bonus condition is met every 100 times that the task completion signal is generated. In such implementations, there is less an element of potential surprise and it may be preferable instead to provide an indication to the user of when, exactly, the next task completion bonus can be expected. Such information may, for example, encourage the user to continue playing if they realize that they will be provided with an additional award in only another few turns.

Figure 20:
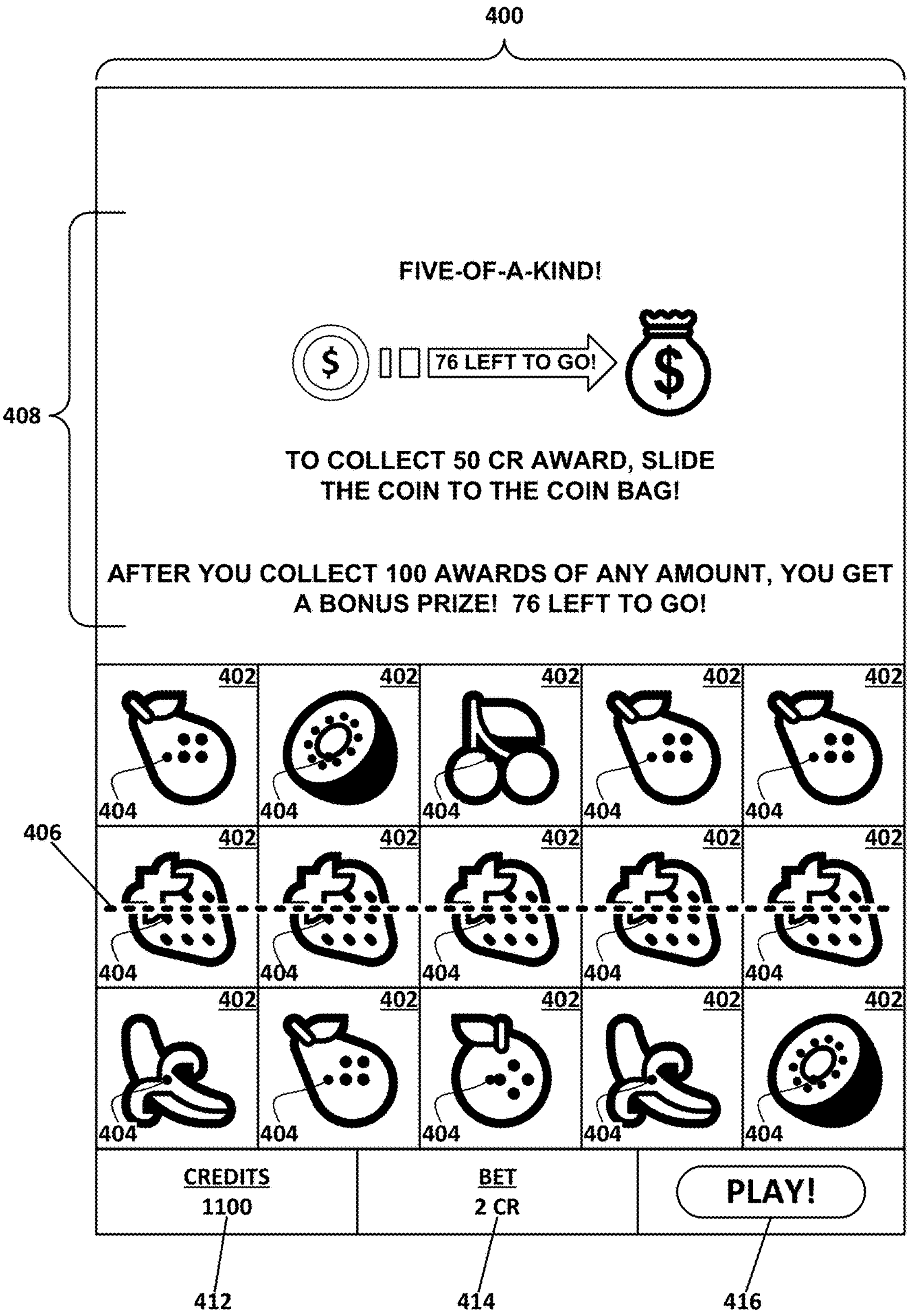
FIG. 20 depicts a variant of the GUI for the game of chance of FIG. 4 featuring a different task GUI element.

FIG. 20 depicts a variant of the GUI for the game of chance of FIG. 4 featuring a task GUI element 408 in which the task GUI element 408 includes information indicating when the task completion bonus will next be determined to be met. In this example, once the user collects 100 awards (of any amount), i.e., causes 100 task completion signals to be generated, then the user will be provided with a task completion bonus. The task GUI element 408 may also indicate, as shown in FIG. 20, the progress that the user has made towards meeting this goal, thereby allowing the user to understand how long it will likely be until they are next awarded a task completion bonus.

It will be appreciated that the exact nature of the task completion bonus may vary between implementations, as discussed earlier. It will also be appreciated that, at the very least with respect to task completion bonuses that are in the form of points or credits that are added to the user's score or credit meter, the amount that is added to the user's score or credit meter may be determined in a variety of ways. For example, in some implementations, such amounts may be a predetermined fixed value, e.g., 50 points or credits every time. In other implementations, the amount awarded may be a predetermined value but may be selected from a plurality of potential values, e.g., there may be a set of potential task completion bonus values that the gaming machine may randomly select from, and the selected value may then be the value that is presented to the user as the task completion bonus. In this case, the task completion bonus is still viewed as being "predetermined" since the user may not have any ability to influence the amount of the task completion bonus. In contrast, implementations that provide bonus games, e.g., such as the implementation depicted in FIGS. 16 through 19, may, in some cases, not be viewed as providing a task completion bonus of a "predetermined" amount since the user's selection from the options 426 may influence the amount awarded.

Figure 21:
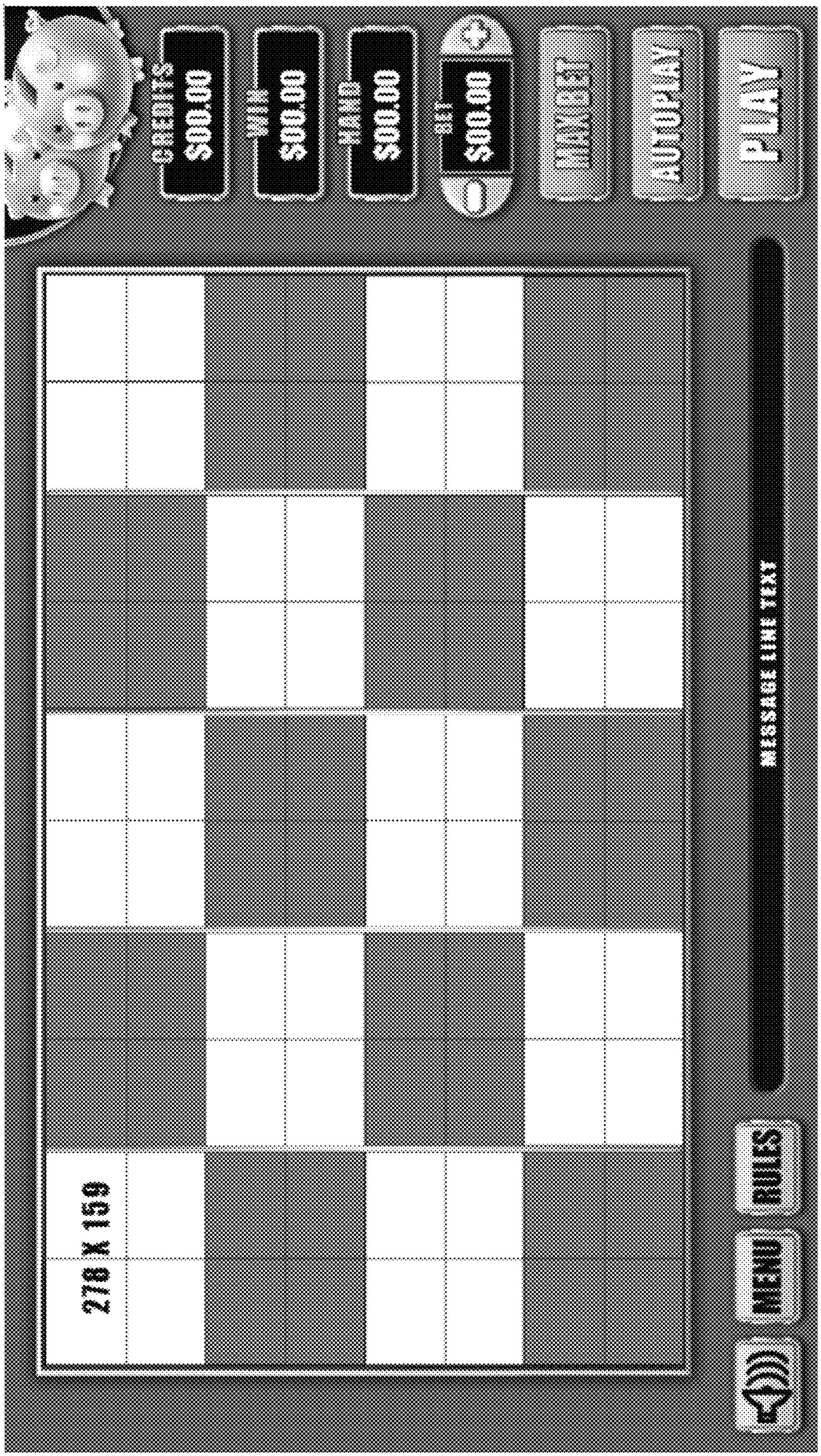
FIG. 21 depicts an example GUI for a game of chance having a task GUI element.

FIG. 21 depicts an example GUI for a game of chance having a task GUI element that includes graphics of two differently colored piggy banks, e.g., a yellow piggy bank and a blue piggy bank, shown in the upper right corner of the game of chance GUI. The GUI for the game of chance in this instance includes five columns of four symbol positions each; when a winning outcome is obtained that results in an award being one, a graphic of a coin (a sub-element of the task GUI element) of a particular color (matching one of the two piggy bank colors) may be displayed in association with the winning outcome. The player may then be prompted to interact with the displayed coin and to drag it to the piggy bank of the matching color in order to perform a skill that will allow the player to collect the award.

Figure 22:
FIG. 22 depicts the example GUI of FIG. 21 with example symbols shown in the symbol positions.

FIG. 22 depicts a version of the GUI for the game of chance of FIG. 21, but with example symbol graphics shown in the symbol positions. A yellow coin is also shown in the middle column, bottom row symbol position, which is an example of a task GUI element sub-element that the player would potentially be required to move, e.g., by dragging it via touch-input, to the yellow-colored piggy bank task GUI element sub-element.

Figure 23:
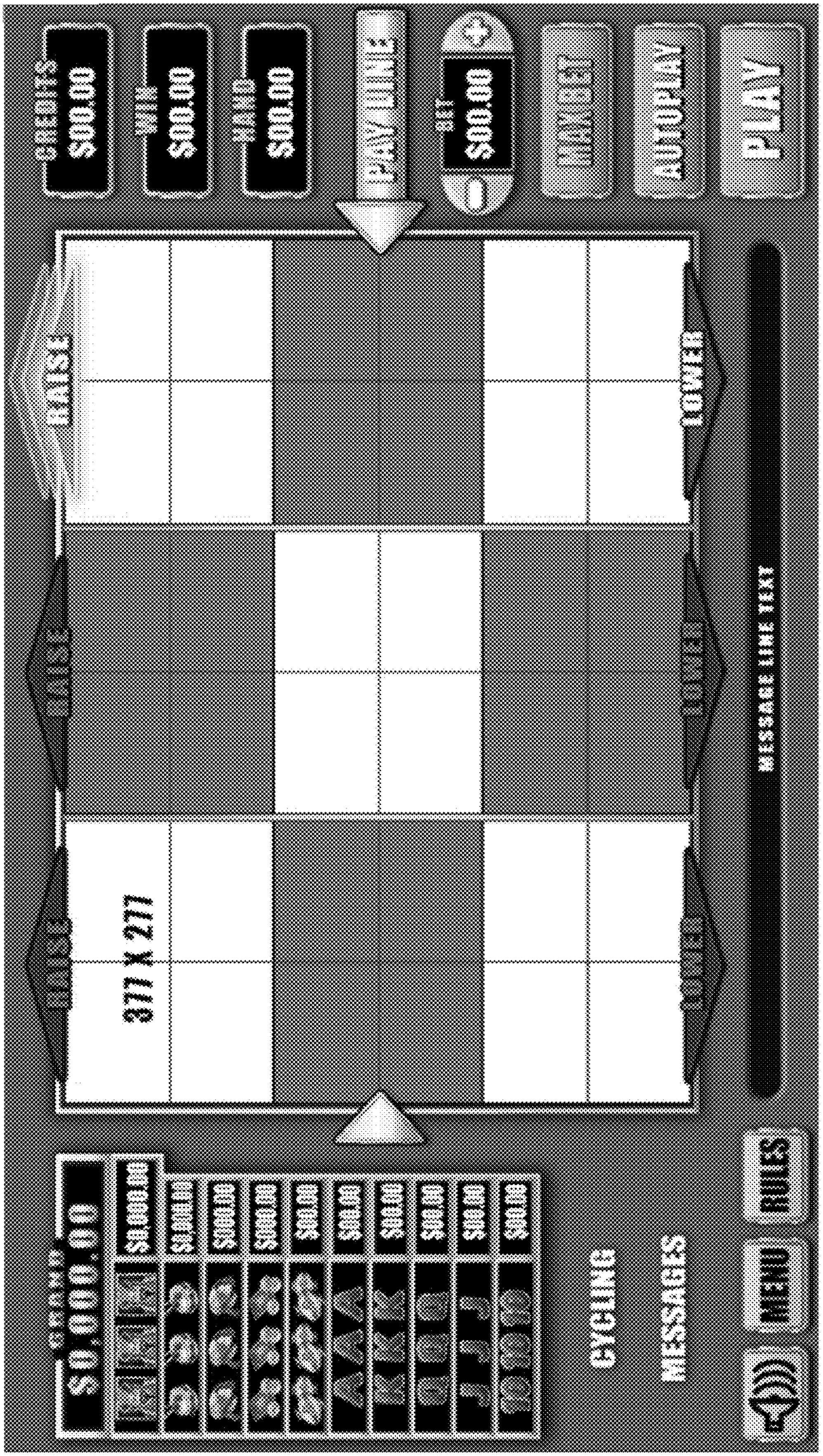
FIG. 23 depicts another example GUI for a game of chance having a task GUI element.
Figure 24:
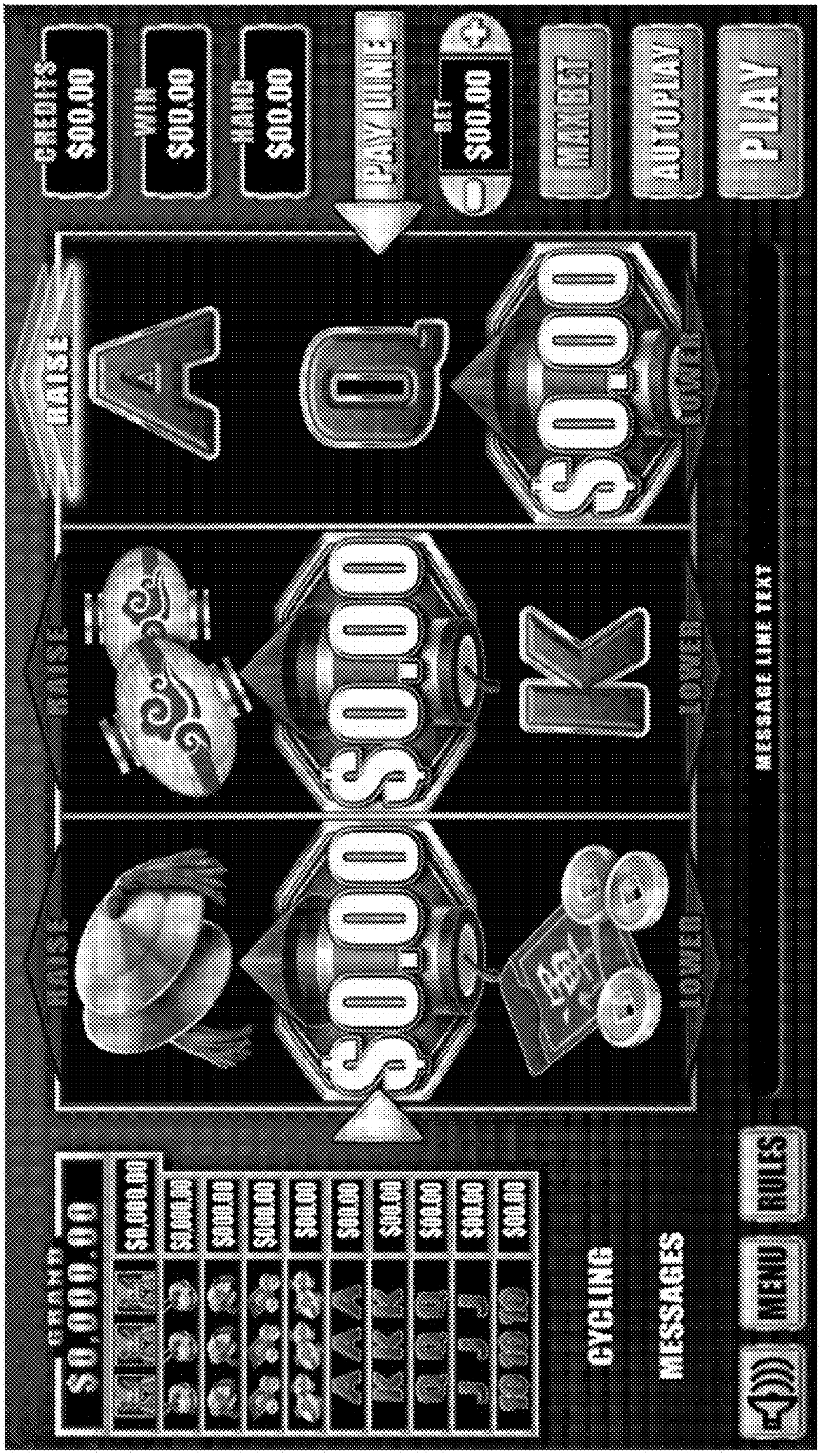
FIG. 24 depicts the example GUI of FIG. 23 with example symbols shown in the symbol positions.

FIG. 23 depicts another example GUI for a game of chance having a task GUI element. In this example, the task GUI element includes triangular "raise" and "lower" buttons at the top and bottom, respectively, of each column of symbol positions. The GUI for the game of chance in this instance includes three columns of three symbol positions each; when a winning outcome is obtained that results in an award being one, the player may be prompted to "nudge" a particular column of symbol positions up or down, e.g., by pressing one of the triangular buttons that may be highlighted in a different color (or animated in some way in order to graphically differentiate it from the other such buttons). The triangular buttons may thus be sub-elements of the task GUI element that the player must interact with in order to performa skill that allows the player to collect the award. FIG. 24 depicts a version of the GUI for the game of chance of FIG. 23, but with example symbol graphics shown in the symbol positions.

It will be appreciated that in the event that a design application is filed based on any of FIGS. 21 through 24, the symbols and symbol positions, at the least, may be shown as disclaimed. It will also be appreciated that such Figures may be rendered as black-and-white line drawings.

It will be further appreciated that while the above examples have focused on slot-type games of chance, the same principles discussed above and depicted in the Figures may be generally applicable in any game of chance, and that the present disclosure is not limited in this respect to only slot machines.

It will also be appreciated that in implementations in which the task completion bonus is provided in the form of a bonus game, the bonus game may take any of a variety of forms, and is not limited to the depicted "pick one" implementation. For example, the bonus game may be a hold-and-spin bonus game, a wheel-spin bonus game, etc.

It will be understood that the various GUIs and game mechanics discussed herein may be implemented entirely locally, e.g., by a processor or processors of a single device, such as a smartphone, or may be provided using processors located in different devices or systems. Information regarding the selection of symbols, awards associated with special symbols, etc., may be transmitted, e.g., via a network connection (wired, wireless, or a mixture of both) to another device, e.g., a smartphone, the processor or processors of which may then implement the GUI and/or feature game mechanic using the information regarding the symbols, awards, etc. Such information may be generated and/or sent in response to receipt of a request from such another device, e.g., a request from a smartphone for the server to provide such information. Such distributed-computing implementations of the GUI provisioning techniques discussed herein is to be understood to also be within the scope of this disclosure.

It will be appreciated that in such distributed computing arrangements, the computer-executable instructions for implementing the GUI may be distributed between different memory devices located in different devices, e.g., the computer-executable instructions for selecting symbols stored on one or more memory devices of a server, while the computer-executable instructions for presenting the GUI may be stored on one or more memory devices of a client gaming device, e.g., a smartphone.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.

b) The client device stores instructions for causing A, B, and C to occur, but the server stores no instructions that cause A, B, and C to occur.

c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.

d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.

e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.

b) The second set of one or more processors may be caused to perform each of A, B, and C, and the first set of one or more processors may not perform any of A, B, or C.

c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.

d) The first set of one or more processors may be caused to perform A and a portion of B, and the second set of one or more processors may be caused to perform C and the remainder of B.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine comprising:
- one or more displays;
- one or more processors; and
- one or more memory devices storing computer-executable instructions which, when executed by the one or more processors, cause the one or more processors to:
  - cause a graphical user interface (GUI) for a game of chance to be presented on the one or more displays;
  - receive one or more indications of a play of the game of chance;
  - generate, responsive to receiving each indication of a play of the game of chance, a corresponding outcome for the game of chance and cause the corresponding outcome to be presented on the one or more displays;
  - determine, for each corresponding outcome, whether the corresponding outcome is a winning outcome associated with a corresponding award;
  - cause, responsive to each determination that a corresponding outcome is a winning outcome, a task GUI element to be activated that requires that one or more sub-elements of the task GUI element be interacted with in a predetermined manner by a user in order to cause a task completion signal associated with that corresponding outcome to be generated;
  - cause, responsive to the generation of multiple task completion signals, a first sub-element of the task GUI element to, responsive to each generation of one of the task completion signals in a subset of the multiple task completion signals, transition to a next graphical state in an ordered sequence of graphical states associated with the first sub-element of the task GUI element;
  - cause, responsive to each generation of the task completion signal, the corresponding award for the corresponding outcome to be added to a credit meter of the GUI for the game of chance;
  - determine, in association with each generation of the task completion signal, whether a task completion bonus condition is met; and
  - cause, responsive to each determination that the task completion bonus condition is met, a task completion bonus to be provided to the user, wherein the task completion bonus is in addition to the corresponding award.

2. The electronic gaming machine of claim 1, wherein the one or more memory devices store further computer-executable instructions which, when executed by the one or more processors, additionally cause the one or more processors to, for each determination of whether the task completion bonus condition is met, randomly determine whether the task completion bonus condition is met.

3. The electronic gaming machine of claim 2, wherein the one or more memory devices store further computer-executable instructions which, when executed by the one or more processors, additionally cause the one or more processors to:
- randomly determine that the task completion bonus is met according to a selected probability;
- select a first probability as the selected probability responsive to the corresponding award having an amount within a first range; and
- select a second probability as the selected probability responsive to the corresponding award having an amount within a second range, wherein the first probability is greater than the second probability and the first range is lower than the second range.

4. The electronic gaming machine of claim 1, wherein the one or more memory devices store further computer-executable instructions which, when executed by the one or more processors, additionally cause the one or more processors to count, from a first time, a number of task completion signals generated since the first time and to determine that the task completion bonus condition is met when the number of task completion signals generated since the first time meets a first threshold number.

5. The electronic gaming machine of claim 1, wherein the one or more memory devices store further computer-executable instructions which, when executed by the one or more processors, additionally cause the one or more processors to provide the task completion bonus to the user by adding a predetermined amount to the credit meter of the GUI for the game of chance.

6. The electronic gaming machine of claim 1, wherein the one or more memory devices store further computer-executable instructions which, when executed by the one or more processors, additionally cause the one or more processors to provide the task completion bonus to the user by:
- causing a bonus game GUI to be presented for one or more bonus game plays,
- determining, based on outcomes for the bonus game, a bonus game award amount, and
- adding the bonus game award amount to the credit meter of the GUI for the game of chance.

7. The electronic gaming machine of claim 1, wherein;
- the one or more memory devices store further computer-executable instructions which, when executed by the one or more processors, additionally cause the one or more processors to:
  - cause an award animation involving, at least in part, the first sub-element of the task GUI to be presented responsive to the task completion bonus condition being met.

8. One or more non-transitory, computer-readable media storing computer-executable instructions which, when executed by one or more processors, cause the one or more processors to:
- cause a graphical user interface (GUI) for a game of chance to be presented on one or more displays of a gaming machine;
- receive one or more indications of a play of the game of chance;
- generate, responsive to receiving each indication of a play of the game of chance, a corresponding outcome for the game of chance and cause the corresponding outcome to be presented on the one or more displays;

determine, for each corresponding outcome, whether the corresponding outcome is a winning outcome associated with a corresponding award;

cause, responsive to each determination that a corresponding outcome is a winning outcome, a task GUI element to be activated that requires that one or more sub-elements of the task GUI element be interacted with in a predetermined manner by a user in order to cause a task completion signal associated with that corresponding outcome to be generated;

cause, responsive to the generation of multiple task completion signals, a first sub-element of the task GUI element to, responsive to each generation of one of the task completion signals in a subset of the multiple task completion signals, transition to a next graphical state in an ordered sequence of graphical states associated with the first sub-element of the task GUI element;

cause, responsive to each generation of the task completion signal, the corresponding award for the corresponding outcome to be added to a credit meter of the GUI for the game of chance;

determine, in association with each generation of the task completion signal, whether a task completion bonus condition is met; and cause, responsive to each determination that the task completion bonus condition is met, a task completion bonus to be provided to the user, wherein the task completion bonus is in addition to the corresponding award.

9. The one or more non-transitory, computer-readable media of claim 8, further storing additional computer-executable instructions which, when executed by the one or more processors, additionally cause the one or more processors to, for each determination of whether the task completion bonus condition is met, randomly determine whether the task completion bonus condition is met.

10. The one or more non-transitory, computer-readable media of claim 8, further storing additional computer-executable instructions which, when executed by the one or more processors, additionally cause the one or more processors to count, from a first time, a number of task completion signals generated since the first time and to determine that the task completion bonus condition is met when the number of task completion signals generated since the first time meets a first threshold number.

11. The one or more non-transitory, computer-readable media of claim 8, further storing additional computer-executable instructions which, when executed by the one or more processors, additionally cause the one or more processors to provide the task completion bonus to the user by adding a predetermined amount to the credit meter of the GUI for the game of chance.

12. The one or more non-transitory, computer-readable media of claim 8, further storing additional computer-executable instructions which, when executed by the one or more processors, additionally cause the one or more processors to provide the task completion bonus to the user by:

causing a bonus game GUI to be presented for one or more bonus game plays, determining, based on outcomes for the bonus game, a bonus game award amount, and adding the bonus game award amount to the credit meter of the GUI for the game of chance.

13. The one or more non-transitory, computer-readable media of claim 8, wherein the one or more non-transitory, computer-readable media further store additional computer-executable instructions which, when executed by the one or more processors, additionally cause the one or more processors to:

cause an award animation involving, at least in part, the first sub-element of the task GUI to be presented responsive to the task completion bonus condition being met.

14. The one or more non-transitory, computer-readable media of claim 8, wherein the ordered sequence of graphical states depicts the first sub-element of the task GUI element in increasingly enlarged states.

15. A method comprising:

causing, by one or more processors of an electronic gaming machine having one or more displays, a graphical user interface (GUI) for a game of chance to be presented on the one or more displays;

receiving, by the one or more processors, one or more indications of a play of the game of chance;

generating, by the one or more processors and responsive to receiving each indication of a play of the game of chance, a corresponding outcome for the game of chance and causing the corresponding outcome to be presented on the one or more displays;

determining, by the one or more processors and for each corresponding outcome, whether the corresponding outcome is a winning outcome associated with a corresponding award;

determining, by the one or more processors and at least one of the corresponding outcomes, that the corresponding outcome is a winning outcome associated with a corresponding award;

causing, by the one or more processors and responsive to each determination that a corresponding outcome is a winning outcome, a task GUI element to be activated that requires that one or more sub-elements of the task GUI element be interacted with in a predetermined manner by a user in order to cause a task completion signal associated with that corresponding outcome to be generated;

causing, by the one or more processors and responsive to the generation of multiple task completion signals, a first sub-element of the task GUI element to, responsive to each generation of one of the task completion signals in a subset of the multiple task completion signals, transition to a next graphical state in an ordered sequence of graphical states associated with the first sub-element of the task GUI element;

generating, by the one or more processors, at least one task completion signal responsive to the one or more sub-elements of the task GUI element being interacted with in the predetermined manner;

causing, by the one or more processors and responsive to each generation of the task completion signal, the corresponding award for the corresponding outcome to be added to a credit meter of the GUI for the game of chance;

determining, by the one or more processors and in association with the generation of at least one task completion signal, that a task completion bonus condition is met; and causing, by the one or more processors and responsive to determining that the task completion bonus condition is met, a task completion bonus to be provided to the user, wherein the task completion bonus is in addition to the corresponding award.

16. The method of claim 15, further comprising randomly determining, by the one or more processors, that the task completion bonus condition is met.

17. The method of claim 15, further comprising determining, by the one or more processors, that the task completion bonus condition is met by a number of task completion signals generated since a first time meeting a first threshold number.

18. The method of claim 15, further comprising providing, by the one or more processors, the task completion bonus to the user by causing a predetermined amount to be added to the credit meter of the GUI for the game of chance.

19. The method of claim 15, further comprising providing the task completion bonus to the user by:

causing a bonus game GUI to be presented for one or more bonus game plays;

determining, based on outcomes for the bonus game, a bonus game award amount; and adding the bonus game award amount to the credit meter of the GUI for the game of chance.

20. The method of claim 15, further comprising:

generating, by the one or more processors, the multiple task completion signals responsive to multiple instances of the one or more sub-elements of the task GUI element being interacted with in the predetermined manner;

causing, by the one or more processors, an award animation involving, at least in part, the first sub-element of the task GUI to be presented responsive to the task completion bonus condition being met.

* * * * *